US011902967B2

(12) United States Patent
Lee et al.

(10) Patent No.: US 11,902,967 B2
(45) Date of Patent: Feb. 13, 2024

(54) DEVICE OF HANDLING A HARQ RETRANSMISSION

(71) Applicant: ACER INCORPORATED, New Taipei (TW)

(72) Inventors: Chien-Min Lee, New Taipei (TW); Li-Chung Lo, New Taipei (TW); Jen-Hsien Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 228 days.

(21) Appl. No.: 17/503,379

(22) Filed: Oct. 18, 2021

(65) Prior Publication Data

US 2022/0132535 A1 Apr. 28, 2022

Related U.S. Application Data

(60) Provisional application No. 63/094,912, filed on Oct. 22, 2020.

(51) Int. Cl.
*H04W 28/04* (2009.01)
*H04L 1/1812* (2023.01)
(Continued)

(52) U.S. Cl.
CPC ....... *H04W 72/1268* (2013.01); *H04L 1/1819* (2013.01); *H04L 5/0053* (2013.01); *H04W 72/23* (2023.01); *H04W 72/566* (2023.01)

(58) Field of Classification Search
CPC . H04W 72/1268; H04W 72/23; H04W 72/05; H04W 72/566; H04W 28/04;
(Continued)

(56) References Cited

U.S. PATENT DOCUMENTS 9,800,362 B2 * 10/2017 Yang .................. H04L 5/0055
10,855,403 B2 * 12/2020 Medles ................ H04L 1/1812
(Continued)

FOREIGN PATENT DOCUMENTS

CN 111092704 A 5/2020
WO WO-2020110244 A1 * 6/2020 ........... H04L 1/1822
(Continued)

OTHER PUBLICATIONS

3GPP TSG RAN WG1 Meeting# 63bits, R1-110046 Title: SRS transmission with PUSCH/PUCCH/SRS (Year: 2011).*
(Continued)

*Primary Examiner* — Faruk Hamza
*Assistant Examiner* — Abusayeed M Haque
(74) *Attorney, Agent, or Firm* — Winston Hsu

(57) ABSTRACT

A communication device for handling a hybrid automatic repeat request (HARQ) retransmission, is configured to execute the instructions of receiving a first physical downlink (DL) shared channel (PDSCH) from a network, wherein a first HARQ feedback corresponding to the first PDSCH is allocated in a first uplink (UL) channel and the first UL channel is corresponding to a first priority index; determining not to transmit the first HARQ feedback in the first UL channel; determining a second UL channel for the first HARQ feedback, wherein the second UL channel is corresponding to a second priority index; and transmitting the first HARQ feedback in the second UL channel.

23 Claims, 15 Drawing Sheets

(51) Int. Cl.
*H04W 72/1268* (2023.01)
*H04L 5/00* (2006.01)
*H04W 72/23* (2023.01)
*H04W 72/566* (2023.01)

(58) Field of Classification Search
CPC ... H04L 5/0053; H04L 1/1812; H04L 1/1607; H04L 5/0055
See application file for complete search history.

(56) References Cited

U.S. PATENT DOCUMENTS

| | | | | |
|---|---|---|---|---|
| 2015/0200751 | A1* | 7/2015 | Yin | H04L 5/001 370/280 |
| 2019/0253986 | A1* | 8/2019 | Jeon | H04L 5/0048 |
| 2020/0036494 | A1* | 1/2020 | He | H04L 1/1861 |
| 2021/0007087 | A1* | 1/2021 | Wei | H04W 72/21 |
| 2022/0046722 | A1* | 2/2022 | Kim | H04L 5/0048 |
| 2022/0338222 | A1* | 10/2022 | Kim | H04W 72/1273 |
| 2022/0361247 | A1* | 11/2022 | Awad | H04W 74/0833 |
| 2023/0186252 | A1* | 6/2023 | Burke | G06Q 10/20 705/305 |

FOREIGN PATENT DOCUMENTS

| | | | | |
|---|---|---|---|---|
| WO | WO-2022024393 A1 * | 2/2022 | | H04W 16/28 |
| WO | WO-2022079804 A1 * | 4/2022 | | H04W 28/04 |

OTHER PUBLICATIONS

3GPP TSG RAN WG1 Meeting #92 bits, R1-1803757 Title: Remaining Issues on PDSCH/PUSCH resource allocation (Year: 2018).*

Ericsson, Remaining Issue of Scheduling/HARQ for NR URLLC, 3GPP TSG-RAN WG1 Meeting #100 e-Meeting, Feb. 24-Mar. 6, 2020, Tdoc R1-2000233, XP051853229.

Asia Pacific Telecom, Discussion on HARQ-ACK enhancements, 3GPP TSG-RAN WG1 Meeting #102-e e-Meeting, Aug. 17-28, 2020, R1-2006639, XP051918162.

Qualcomm, Remaining Issues on UCI Enhancements for URLLC, 3GPP TSG RAN WG1 #101e, May 25-Jun. 5, 2020, R1-2004458, XP051886187.

Vivo, Enhancement for Scheduling/HARQ, 3GPP TSG RAN WG1 #102-e e-Meeting, Aug. 17-28, 2020, R1-2005350, XP051917375.

Oppo, Remaining issues on Multi-TRP and panel Transmission, 3GPP TSG RAN WG1 #101 e-Meeting, May 25-Jun. 5, 2020, R1-2004051, XP051885810.

WILUS Inc., Remaining issues on UCI enhancement for NR URLLC, 3GPP TSG RAN WG1 #101 e-Meeting, May 25-Jun. 5, 2020, R1-2004523.

3GPP TS 38.212 V16.3.0 (Sep. 2020), Technical Specification, 3rd Generation Partnership Project; Technical Specification Group Radio Access Network; NR; Multiplexing and channel coding (Release 16), coverpage & p. 2, 88-118, Sep. 2020.

Nokia, Nokia Shanghai Bell, Maintenance of PUSCH enhancements for Rel-16 NR URLLC, 3GPP TSG RAN WG1 Meeting #100bis-e e-Meeting, Apr. 20-30, 2020, R1-2001696.

Apple Inc., Intra-UE Multiplexing/Prioritization for URLLC, 3GPP TSG RAN WG1 #102-e e-Meeting, Aug. 17-28, 2020, R1-2006517.

MediaTek Inc., Multiple HARQ procedures and intra-UE UCI prioritization, 3GPP TSG RAN WG1 Meeting #98 Prague, Czech, Aug. 26-30, 2019, R1-1908409.

* cited by examiner

DEVICE OF HANDLING A HARQ RETRANSMISSION

CROSS REFERENCE TO RELATED APPLICATIONS

This application claims the benefit of U.S. Provisional Application No. 63/094,912 filed on Oct. 22, 2020, which is incorporated herein by reference.

BACKGROUND OF THE INVENTION

1. Field of the Invention

The present invention relates to a device and a method used in a wireless communication system, and more particularly, to a device and a method of handling a hybrid automatic repeat request (HARQ) retransmission.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

A LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

A user equipment (UE) may not be able to transmit a hybrid automatic repeat request (HARQ) feedback due to a certain cause. Communication between the UE and the gNB cannot proceed regularly if the HARQ feedback is not received by the gNB correctly. Thus, a retransmission of the HARQ feedback is an important problem to be solved.

SUMMARY OF THE INVENTION

The present invention therefore provides a device for handling a hybrid automatic repeat request (HARQ) retransmission to solve the abovementioned problem.

A communication device for handling a hybrid automatic repeat request (HARQ) retransmission, comprises at least one storage device; and at least one processing circuit, coupled to the at least one storage device. The at least one storage device stores instructions, and the at least one processing circuit is configured to execute the instructions of receiving a first physical downlink (DL) shared channel (PDSCH) from a network, wherein a first HARQ feedback corresponding to the first PDSCH is allocated in a first uplink (UL) channel and the first UL channel is corresponding to a first priority index; determining not to transmit the first HARQ feedback in the first UL channel; determining a second UL channel for the first HARQ feedback, wherein the second UL channel is corresponding to a second priority index; and transmitting the first HARQ feedback in the second UL channel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
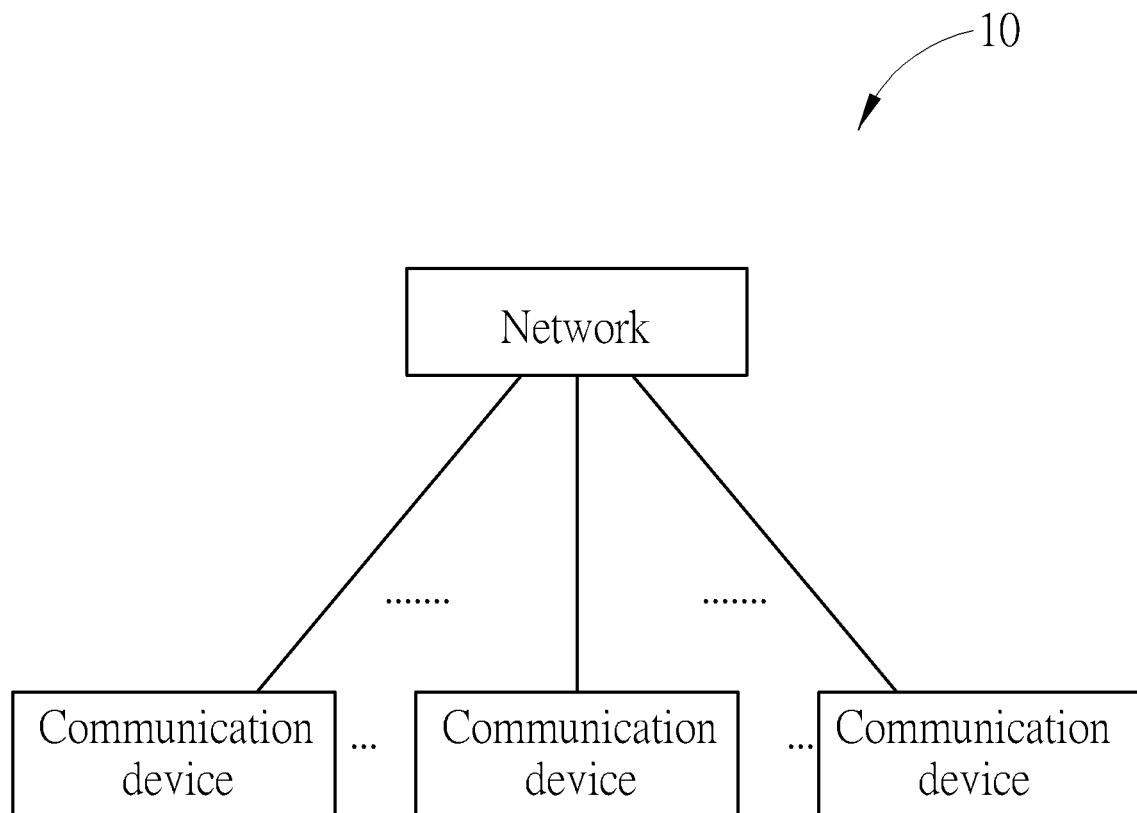
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
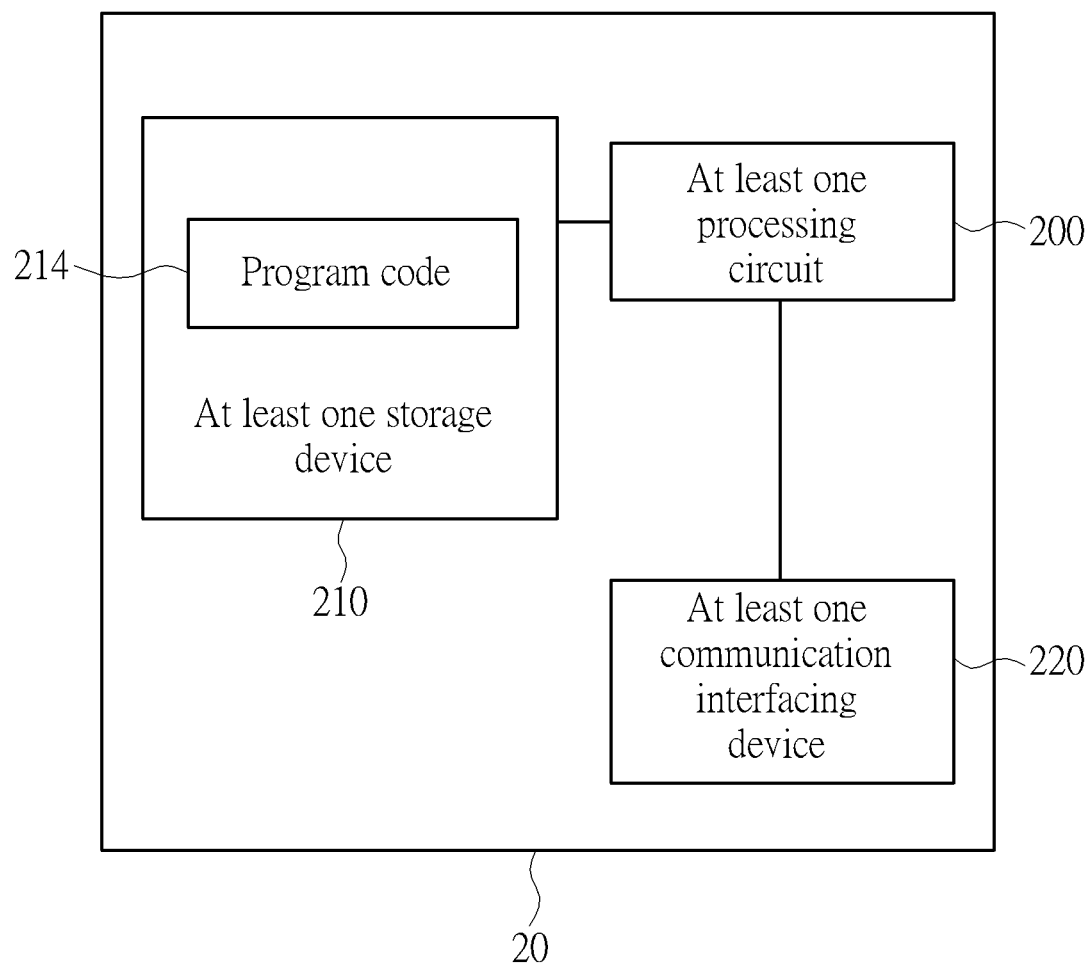
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
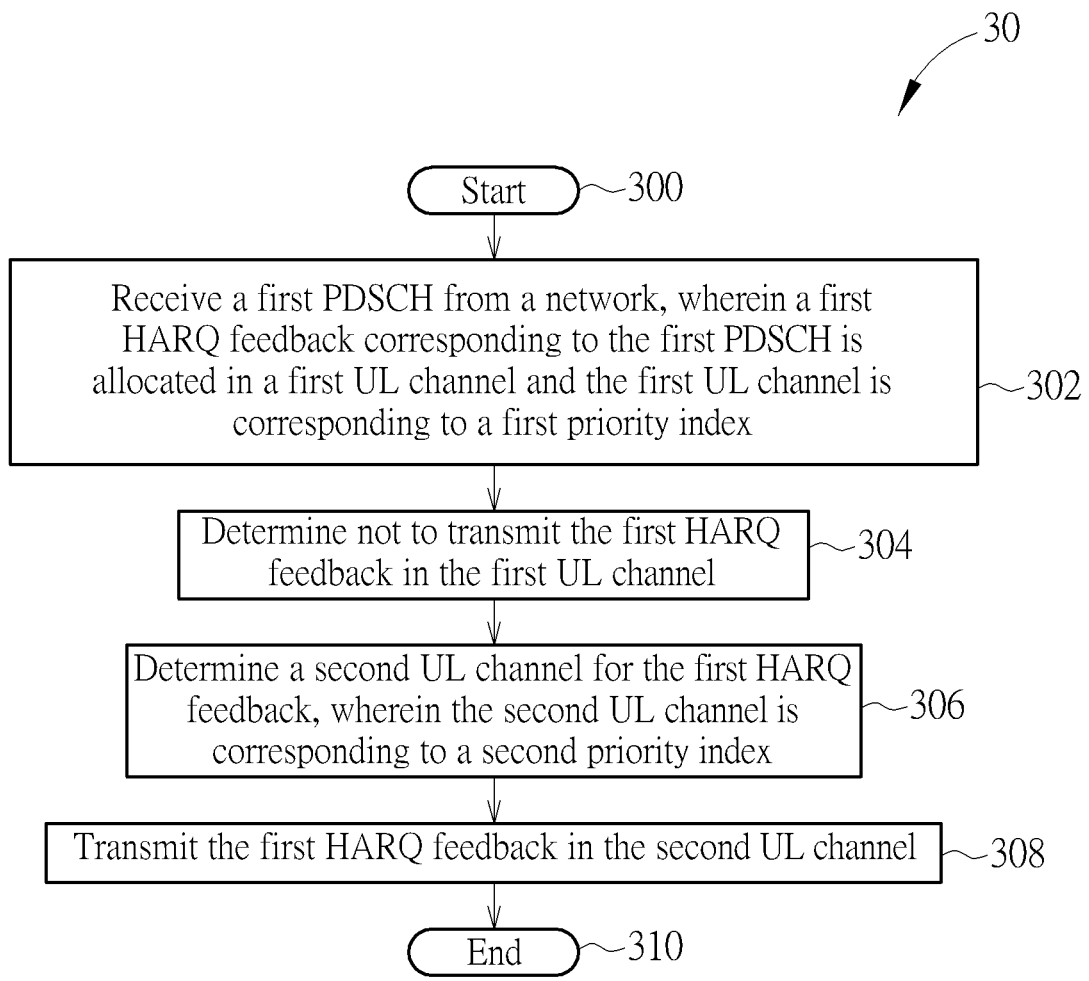
FIG. 3 is a flowchart of a process according to an example of the present invention.

FIG. 3 is a flowchart of a process 30 according to an example of the present invention. The process 30 may be utilized in a communication device, to handle a hybrid automatic repeat request (HARQ) retransmission. The process 30 may be compiled into the program codes 214 and includes the following steps:

Step 300: Start.

Step 302: Receive a first physical DL shared channel (PDSCH) from a network, wherein a first HARQ feedback corresponding to the first PDSCH is allocated in a first UL channel and the first UL channel is corresponding to a first priority index.

Step 304: Determine not to transmit the first HARQ feedback in the first UL channel.

Step 306: Determine a second UL channel for the first HARQ feedback, wherein the second UL channel is corresponding to a second priority index.

Step 308: Transmit the first HARQ feedback in the second UL channel.

Step 310: End.

According to the process 30, the communication device receives a first PDSCH from a network, wherein a first HARQ feedback corresponding to the first PDSCH is allocated in a first UL channel and the first UL channel is corresponding to (e.g., configured with or indicated with) a first priority index. The communication device determines (e.g., is configured to) not to transmit the first HARQ feedback in the first UL channel. Then, the communication device determines (e.g., selects) a second UL channel for the first HARQ feedback, wherein the second UL channel is corresponding to (e.g., configured with) a second priority index. The communication device transmits the first HARQ feedback in the second UL channel. That is, the communication device transmits (e.g., retransmission) the first HARQ feedback in the second UL channel, since the communication device cannot transmit (e.g., initial transmission) the first HARQ feedback in the first UL channel. Thus, the problem of the retransmission of the HARQ feedback is solved.

Realization of the process 30 is not limited to the above description. The following examples may be applied for realizing the process 30.

In one example, the second UL channel is indicated (e.g., scheduled) by a first DL control information (DCI). In one example, a location of the first HARQ feedback in the second UL channel is determined according to the first DCI. In one example, a first payload size reserved for transmitting the first HARQ feedback is determined according to the first DCI. In one example, a first control resource set (CORSET) pool index of the first DCI and a second CORESET pool index of a second DCI indicating the first PDSCH are the same. In one example, the first DCI does not indicate any PDSCH. That is, the first DCI may be for a specific purpose. In one example, the first DCI comprises a first downlink assignment index (DAI) corresponding to the first priority index and a second DAI corresponding to the second priority index.

In one example, the first DCI is received after the first UL channel. In one example, the first DCI is received after determining not to transmit the first HARQ feedback in the first UL channel.

In one example, the second UL channel is a second repetition of a physical UL shared channel (PUSCH) after a first repetition of the PUSCH, and the first UL channel is the first repetition of the PUSCH.

In one example, the communication device determines not to transmit the first HARQ feedback in the first UL channel and transmits the first HARQ feedback in the second UL channel according to an indication transmitted by the network. That is, not all HARQ feedback can be retransmitted after being cancelled in the first UL channel, and the communication device is allowed to retransmit the first HARQ feedback according to the indication. In one example, the indication may be a radio resource control (RRC) signaling or a DCI.

In one example, the first priority index and the second priority index are the same.

In one example, a first location of the first HARQ feedback in the second UL channel is after a second location of a second HARQ feedback, and the second HARQ feedback is an initial transmission in the second UL channel. That is, the initial transmission and the retransmission of the HARQ feedbacks are jointly transmitted in the second UL channel. For example, the first HARQ feedback is a HARQ feedback corresponding to a semi-persistent scheduling (SPS) PDSCH, or is a HARQ feedback corresponding to a PDSCH indicated (or scheduled) by a DCI.

In one example, a first location of the first HARQ feedback in the second UL channel is determined according to the first priority index and the second priority index.

In one example, a first payload size reserved for transmitting the first HARQ feedback is a fixed value, or is determined according to a configuration of the network.

In one example, a time distance between the first UL channel and the second UL channel is not greater than a threshold. In one example, the threshold is indicated by the network. For example, the communication device transmits the first HARQ feedback in the second UL channel, before a timer corresponding to the threshold expires. That is, the communication device transmits the first HARQ feedback within a specific time period. The communication device may drop the first HARQ feedback, if the first HARQ feedback cannot be transmitted before the timer expires.

In one example, the first PDSCH is scheduled by a second DCI. In one example, the first PDSCH is scheduled by a semi-persistent scheduling (SPS). In one example, the communication device determines not to transmit the first HARQ feedback according to an indication (e.g., transmitted by the network). That is, the communication device drops (or stops transmitting) the first HARQ feedback according to the indication. The indication may be a cancellation indication (CI).

In one example, the communication device determines not to transmit the first HARQ feedback, when the first UL channel is collided (e.g., overlapped) with a third UL channel and the third UL channel is corresponding to (e.g., configured with or indicated with) a third priority index higher than the first priority index. Note that the first UL channel and the third UL channel may be in a same slot (or a same sub-slot).

In one example, the second UL channel comprises a second HARQ feedback corresponding to (e.g., configured with) a third priority index different from the first priority index.

In one example, a second payload size reserved for transmitting a second HARQ feedback in the second UL channel is determined according to a third DCI indicating the second UL channel. In one example, the second priority index of the second UL channel is determined according to a third DCI indicating the second UL channel.

Figure 4:
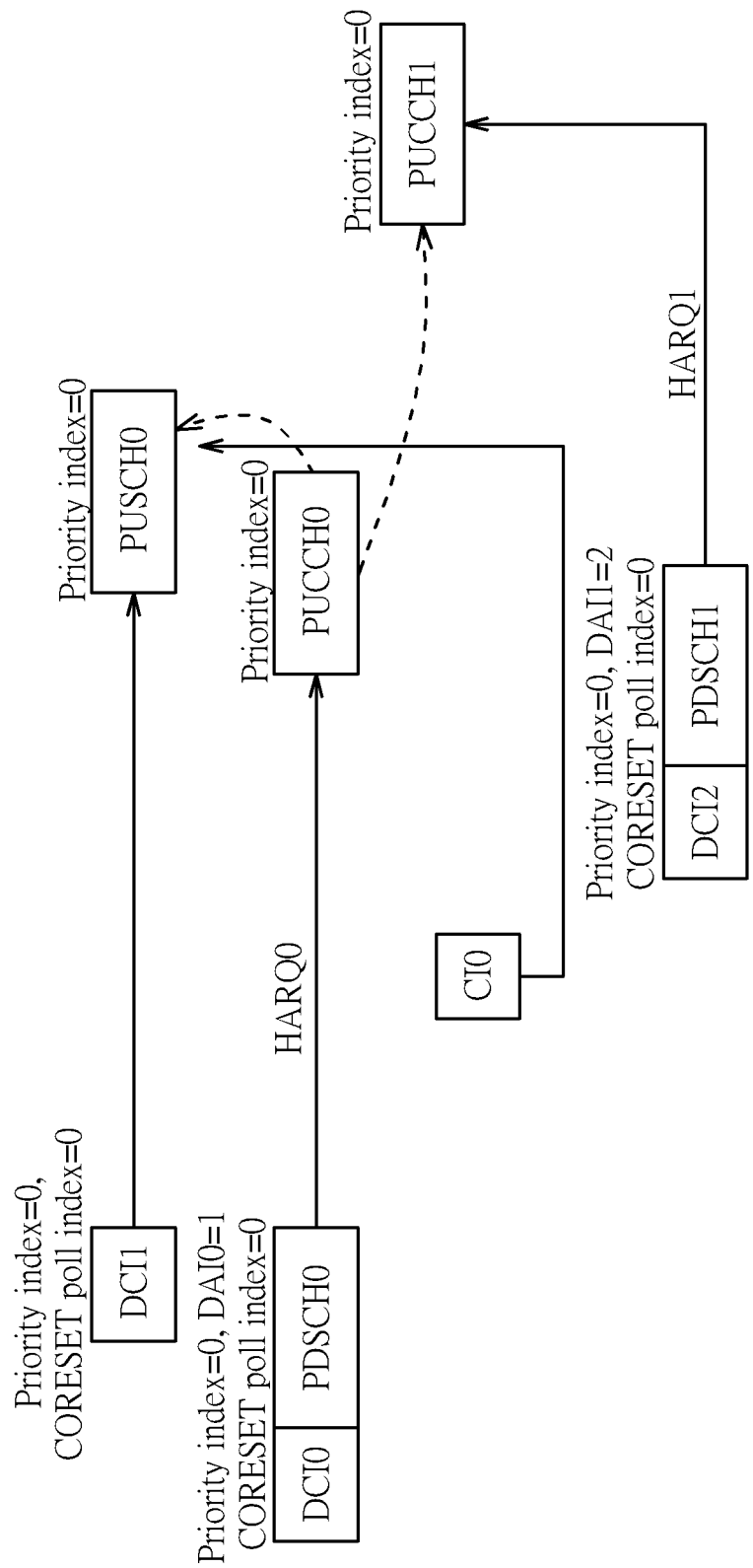
FIG. 4 is a schematic diagram of a retransmission of a HARQ feedback according to an example of the present invention.

FIG. 4 is a schematic diagram of a retransmission of a HARQ feedback according to an example of the present invention. The communication device receives a DCI DCI0, and the DCI DCI0 indicates (e.g., schedules) a reception of a PDSCH PDSCH0. In addition, the DCI DCI0 may indicate a DAI (e.g., DAI0=1) for the PDSCH PDSCH0. The communication device prepares (e.g., is scheduled) to transmit a HARQ feedback HARQ0 in a PUCCH PUCCH0, after receiving the PDSCH PDSCH0. In one example, the PDSCH PDSCH0 may be a SPS PDSCH, i.e., not scheduled by a DCI.

In addition, the communication device may multiplex the HARQ feedback HARQ0 of the PUCCH PUCCH0 with a PUSCH PUSCH0, if the PUSCH PUSCH0 is collided with the PUCCH PUCCH0 (e.g., in a time period). In this situation, the communication device may not transmit the PUCCH PUCCH0 since the HARQ feedback HARQ0 has been multiplexed and transmitted in the PUSCH PUSCH0. For example, the PUSCH PUSCH0 may be scheduled by a DCI (e.g., a DCI DCI1), or the PUSCH PUSCH0 may be a configured grant (CG) transmission.

However, the communication device may determine not to transmit (e.g., cancel) the HARQ feedback HARQ0. In one example, the communication device receives an indication (e.g., a CI CI0) indicating not to transmit the PUSCH PUSCH0, after receiving the DCI DCI1. In one example, the communication device receives an indication (e.g., the CI CI0), and determines not to transmit the PUSCH PUSCH0 according to the indication. In one example, the communication device determines not to transmit (e.g., cancel) the PUSCH PUSCH0, if the PUSCH PUSCH0 is collided with an UL transmission (e.g., a PUSCH or a PUCCH) and a priority index of the UL transmission is higher than a priority index of the PUSCH PUSCH0. In the above examples, the PUSCH PUSCH0 including the HARQ feedback HARQ0 may not be transmitted.

In the present example, the communication device receives a DCI DCI2 after receiving the indication (e.g., the CI CI0), and the DCI DCI2 indicates (e.g., schedules) a reception of a PDSCH PDSCH1. In addition, the DCI DCI2 may indicate a DAI (e.g., DAI1=2) for the PDSCH PDSCH1. The DCI DCI2 may be a latest DCI after the indication. The communication device prepares to transmit a HARQ feedback HARQ1 in a PUCCH PUCCH1 in response to the reception of the PDSCH PDSCH1. Then, the communication device transmits the HARQ feedbacks HARQ0 and HARQ1 in the PUCCH PUCCH1. Note that the PUCCH PUCCH1 is not overlapped with the PUCCH PUCCH0 and the PUSCH PUSCH0. A priority index of the PUCCH PUCCH1 may be indicated by (or determined according to) the DCI DCI2. In one example, the priority index of the PUCCH PUCCH1 may be indicated by a RRC signaling, if the PDSCH PDSCH0 is a SPS PDSCH.

It should be noted that a time instant at which the communication device receives the DCI DCI2 is not limited to the content of the figure. In one example, the DCI DCI2 is received after the PUSCH PUSCH0. In one example, the DCI DCI2 is received after the communication device determines not to transmit the HARQ feedback HARQ0 in the PUSCH PUSCH0 (e.g., after the CI CI0).

In the present example, a priority index of the PUCCH PUCCH0 and a priority index of the PUCCH PUCCH1 are the same (or a priority index of the PDSCH PDSCH0 and a priority index of the PDSCH PDSCH1 are the same), e.g., 0. The HARQ feedback HARQ0 may not be transmitted in the PUCCH PUCCH1, if the priority indices of the PUCCH PUCCH0 and the PUCCH PUCCH1 are different (or if the priority indices of the PDSCH PDSCH0 and the PDSCH PDSCH1 are different). In one example, the priority index of the PUCCH PUCCH0 may be indicated by the DCI DCI0 scheduling the PDSCH PDSCH0. In one example, the priority index of the PUCCH PUCCH1 may be indicated by the DCI DCI2 scheduling the PDSCH PDSCH1.

In the present example, a first CORSET pool index of a first COREST for transmitting the DCI DCI0 and a second CORESET index of a second CORESET for transmitting the DCI DCI2 are the same, e.g., 0. The HARQ feedback HARQ0 may not be transmitted in the PUCCH PUCCH1, if the first CORSET pool index of the first COREST and the second CORESET index of the second CORESET are different.

In the present example, the communication device determines not to transmit the HARQ feedback HARQ0 in the PUSCH PUSCH0, and determines to transmit the HARQ feedback HARQ0 in the PUCCH PUCCH1. Whether the communication device can perform such operation may depend on a capability (e.g., UE capability) of the communication device. The communication device may report the capability regarding the retransmission of the HARQ feedback to the network.

In one example, the communication device may receive the DCI DCI2 and the PDSCH PDSCH1 before receiving the indication. The HARQ feedback HARQ1 is not for a retransmission. The HARQ feedback HARQ0 may be appended to (i.e., located after) the HARQ feedback HARQ1, when the HARQ feedbacks HARQ0 and HARQ1 are transmitted in the PUCCH PUCCH1.

The communication device may transmit the HARQ feedback HARQ0, when a value of a DAI DAI0 (i.e., 1) of the PDSCH PDSCH0 is smaller than a value of a DAI DAI1 (i.e., 2) of the PDSCH PDSCH1, as shown in FIG. 4. For example, DAI1=DAI0+1. That is, the communication device transmits the HARQ feedback HARQ0 and the HARQ feedback HARQ1 in the PUCCH PUCCH1. The locations of the HARQ feedback HARQ0 and HARQ feedback HARQ1 in the PUCCH PUCCH1 may be determined according to the DAI DAI0 and DAI DAI1, respectively. For example, the first location is for the HARQ feedback HARQ0 since the DAI DAI0=1 and the second location is for the HARQ feedback HARQ1 since the DAI DAI1=2.

In one example, when the PDSCH PDSCH0 is a SPS PDSCH, the HARQ feedback HARQ0 may be appended to (i.e., located after) the HARQ feedback HARQ1 (i.e., not according to the DAI), when the HARQ feedbacks HARQ0 and HARQ1 are transmitted in the PUCCH PUCCH1.

The communication device may not transmit the HARQ feedback HARQ0, when the priorities of the PDSCH PDSCH0 and the PDSCH PDSCH1 are different.

Figure 5:
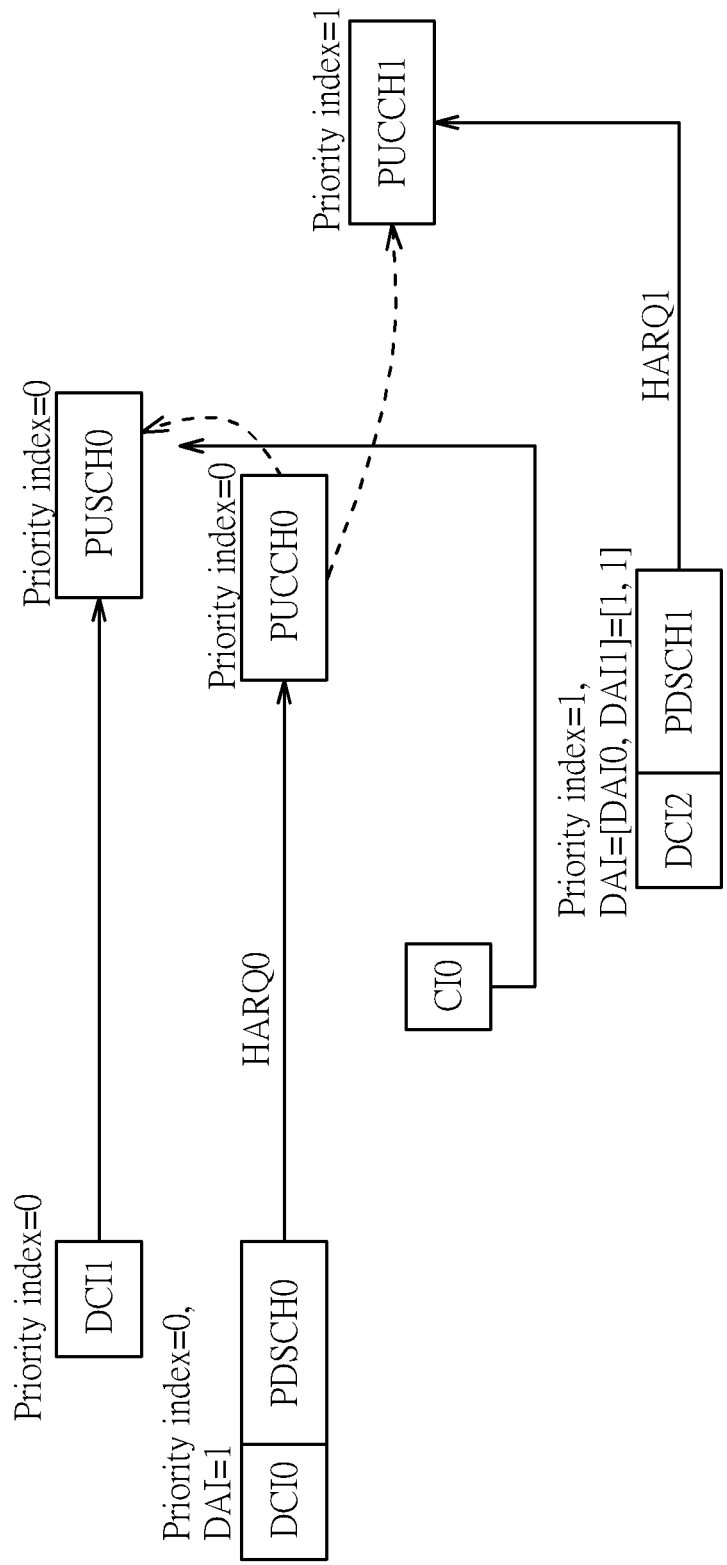
FIG. 5 is a schematic diagram of timing relation of a CI and a DCI for a HARQ retransmission according to an example of the present invention.

FIG. 5 is a schematic diagram of a retransmission of a HARQ feedback according to an example of the present invention. Operations of the communication device are similar to those in FIG. 4. Differences between FIG. 4 and FIG. 5 include that the priority indices of the PUCCH PUCCH0 (priority index=0) and the PUCCH PUCCH1 (priority index=1) are different, and that DAIs corresponding to the priority index=0 and the priority index=1 are DAI0 and DAI1, respectively, and may be transmitted in the DCI DCI2.

Values of the DAIs DAI0 and DAI1 are 1 and 1, respectively. DAI0=1 means that there is resource for the priority index=0 (e.g., a HARQ feedback of the PDSCH PDSCH0) in the PUCCH PUCCH1. DAI1=1 means that there is resource for the priority index=1 (e.g., a HARQ feedback of the PDSCH PDSCH1) in the PUCCH PUCCH1. That is, the values of the DAIs DAI0 and DAI1 mean that the communication device can multiplex the HARQ feedback HARQ0 with the PUCCH PUCCH1. Thus, the communication device may transmit the HARQ feedbacks HARQ0 and HARQ1 in the PUCCH PUCCH1 according to the DAIs DAI0 and DAI1. In one example, the communication device may not transmit the HARQ feedback HARQ0 in the PUCCH PUCCH1, when the DCI DCI2 indicates the DAI DAI0=0.

In one example, a location of the HARQ feedback HARQ0 in the PUCCH PUCCH1 may be determined according to the priority index. For example, a first HARQ feedback corresponding to the priority index=0 is located before (e.g., in front of) a second HARQ feedback corresponding to the priority index=1. For example, the second HARQ feedback corresponding to the priority index=1 is located before (e.g., in front of) the first HARQ feedback corresponding to the priority index=0.

In the present example, the communication device transmits the HARQ feedback HARQ0 in the PUCCH PUCCH1 with a different priority index. Whether the communication device can perform such operation may depend on a capability (e.g., UE capability) of the communication device. The communication device may report the capability regarding the different priority index to the network. For example, the communication device may report a capability regarding to whether a HARQ feedback can be transmit in a UL channel, and the HARQ feedback and the UL channel are corresponding to different priorities.

It should be noted that a time instant at which the communication device receives the DCI DCI2 is not limited to the content of the figure. In one example, the DCI DCI2 is received after the PUSCH PUSCH0. In one example, the DCI DCI2 is received after the communication device determines not to transmit the HARQ feedback HARQ0 in the PUSCH PUSCH0 (e.g., after the CI CI0).

Figure 6:
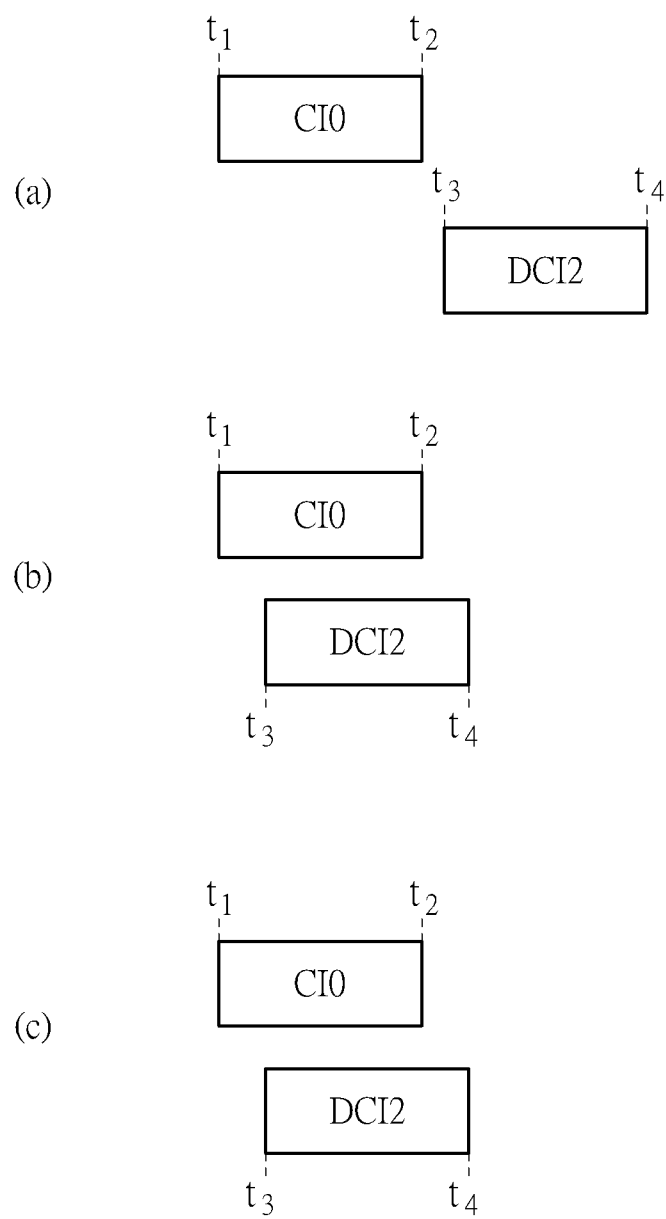
FIG. 6 is a schematic diagram of a retransmission of a HARQ feedback according to an example of the present invention.

FIG. 6 is a schematic diagram of timing relation of an indication (e.g., a CI) and a DCI for a HARQ retransmission according to an example of the present invention. Timing relation between the indication CI0 and the DCI DCI2 in FIG. 4 is discussed in the present example. A start and an end of the indication CI0 are time instants t1 and t2, respectively. A start and an end of the DCI DCI2 are time instants t3 and t4, respectively. Several examples for explaining the situation "the DCI DCI2 is received after the indication CI0" are stated as follows. In the case (a), the start of the DCI DCI2 (t3) is after the end of the indication CI0 (t2). In the case (b), the start of the DCI DCI2 (t3) is after the start of the indication CI0 (t1). In the case (c), the end of the DCI DCI2 (t4) is after the end of the indication CI0 (t2).

Figure 7:
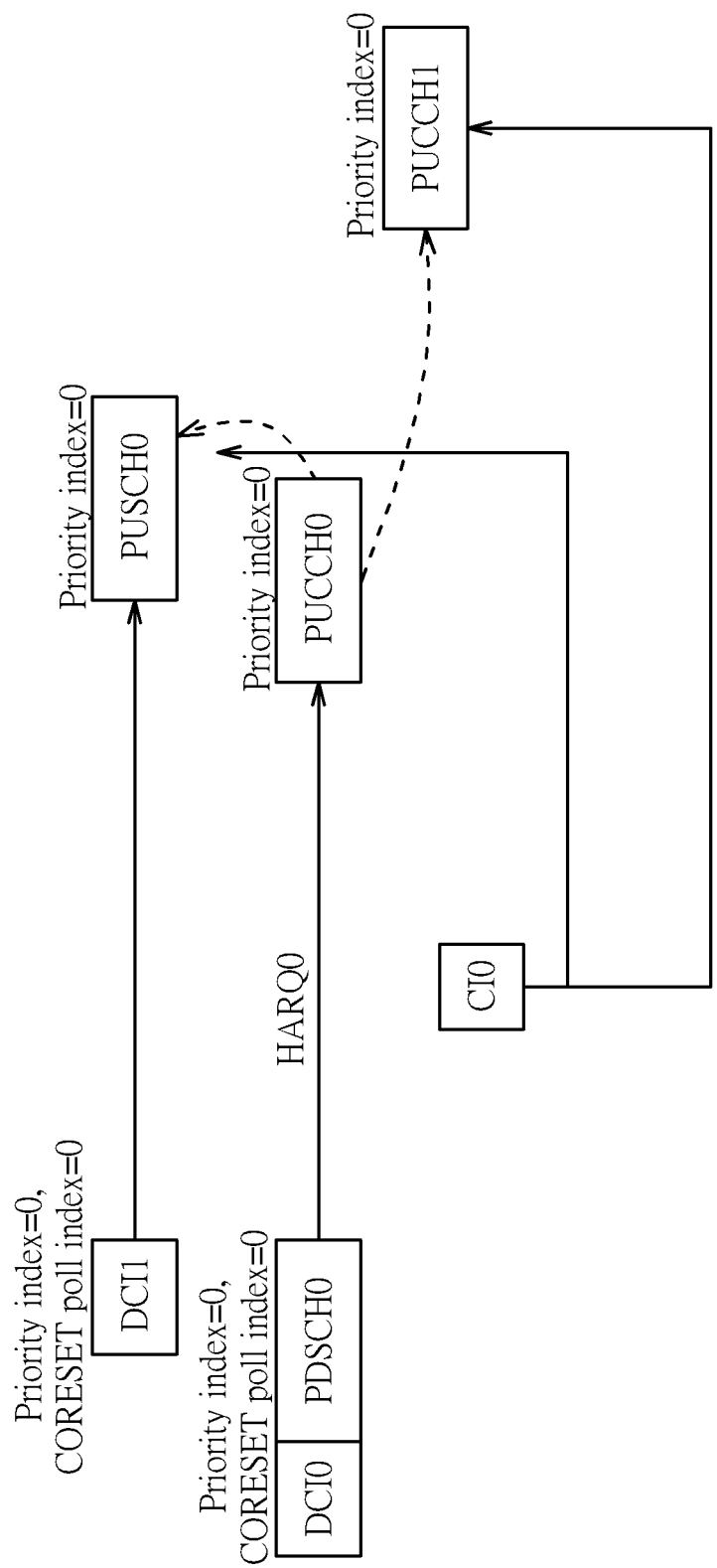
FIG. 7 is a schematic diagram of a retransmission of a HARQ feedback according to an example of the present invention.

FIG. 7 is a schematic diagram of a retransmission of a HARQ feedback according to an example of the present invention. The communication device receives a DCI DCI0, and the DCI DCI0 indicates (e.g., schedules) a reception of a PDSCH PDSCH0. The communication device prepares (e.g., is scheduled) to transmit a HARQ feedback HARQ0 in a PUCCH PUCCH0, after receiving the PDSCH PDSCH0. In one example, the PDSCH PDSCH0 may be a SPS PDSCH, i.e., not scheduled by a DCI.

In addition, the communication device may multiplex the HARQ feedback HARQ0 of the PUCCH PUCCH0 with a PUSCH PUSCH0, if the PUSCH PUSCH0 is collided with the PUCCH PUCCH0 (e.g., in a time period). In this situation, the communication device may not transmit the PUCCH PUCCH0 since the HARQ feedback HARQ0 has been multiplexed and transmitted in the PUSCH PUSCH0. For example, the PUSCH PUSCH0 may be scheduled by a DCI (e.g., a DCI DCI1), or the PUSCH PUSCH0 may be a CG transmission.

However, the communication device may determine not to transmit (e.g., cancel) the HARQ feedback HARQ0. In one example, the communication device receives an indication (e.g., a CI CI0) indicating not to transmit the PUSCH PUSCH0, after receiving the DCI DCI1. In one example, the communication device receives the indication (e.g., the CI CI0), and determines not to transmit the PUSCH PUSCH0 according to the indication. In one example, the communication device determines not to transmit (e.g., cancel) the PUSCH PUSCH0, if the PUSCH PUSCH0 is collided with an UL transmission (e.g., a PUSCH or a PUCCH) and a priority index of the UL transmission is higher than a priority index of the PUSCH PUSCH0. In the above examples, the PUSCH PUSCH0 including the HARQ feedback HARQ0 may not be transmitted.

In the present example, the communication device does not need to find another DCI indicating another UL resource (e.g., a PUCCH) for transmitting the HARQ feedback HARQ0. The communication device may determine a PUCCH PUCCH1 for transmitting the HARQ feedback HARQ0 according to the indication (e.g., CI CI0). Then, the communication device transmits the HARQ feedback HARQ0 in the PUCCH PUCCH1. Note that the PUCCH PUCCH1 is not overlapped with both the PUCCH PUCCH0 and the PUSCH PUSCH0. A priority index of the PUCCH PUCCH1 may be indicated by (or determined according to) the indication.

In the present example, a priority index of the PUCCH PUCCH0 and a priority index of the PUCCH PUCCH1 are the same (or a priority index of the PDSCH PDSCH0 and a priority index of the PUCCH PUCCH1 are the same), e.g., 0. The HARQ feedback HARQ0 may not be transmitted in the PUCCH PUCCH1, if the priority indices of the PUCCH PUCCH0 and the PUCCH PUCCH1 are different (or if the priority indices of the PDSCH PDSCH0 and the PUCCH PUCCH1 are different).

In the present example, a first CORSET pool index of a first COREST for transmitting the DCI DCI0 and a second CORESET index of a second CORESET for transmitting the indication (e.g., the CI CI0) are the same, e.g., 0. The HARQ feedback HARQ0 may not be transmitted in the PUCCH PUCCH1, if the first CORSET pool index of the first COREST and the second CORESET index of the second CORESET are different.

Figure 8:
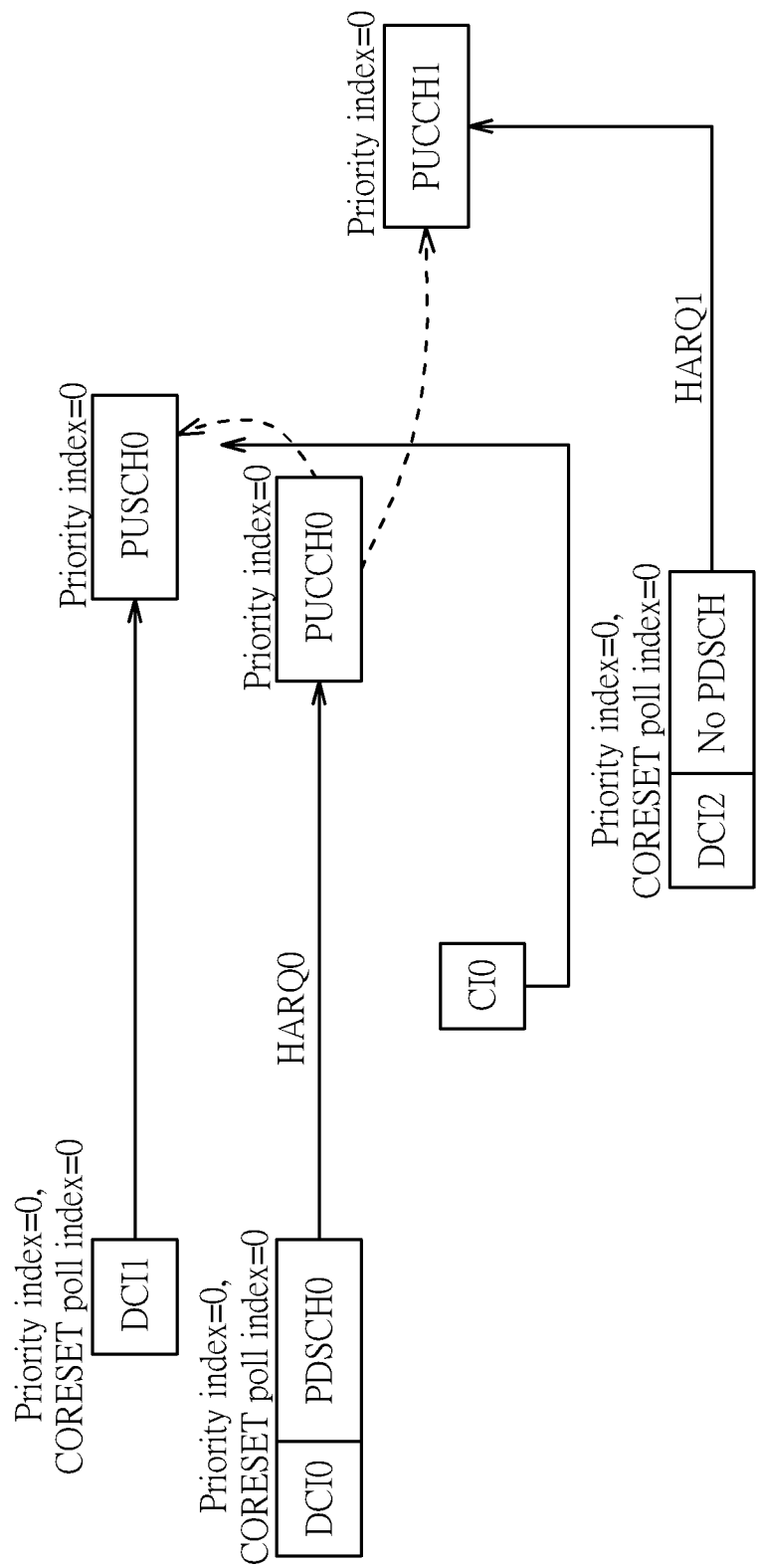
FIG. 8 is a schematic diagram of a retransmission of a HARQ feedback according to an example of the present invention.

FIG. 8 is a schematic diagram of a retransmission of a HARQ feedback according to an example of the present invention. The communication device receives a DCI DCI0, and the DCI DCI0 indicates (e.g., schedules) a reception of a PDSCH PDSCH0. The communication device prepares (e.g., is scheduled) to transmit a HARQ feedback HARQ0 in a PUCCH PUCCH0, after receiving the PDSCH PDSCH0. In one example, the PDSCH PDSCH0 may be a SPS PDSCH, i.e., not scheduled by a DCI.

In addition, the communication device may multiplex the HARQ feedback HARQ0 of the PUCCH PUCCH0 with a PUSCH PUSCH0, if the PUSCH PUSCH0 is collided with the PUCCH PUCCH0 (e.g., in a time period). In this situation, the communication device may not transmit the PUCCH PUCCH0 since the HARQ feedback HARQ0 has been multiplexed and transmitted in the PUSCH PUSCH0. For example, the PUSCH PUSCH0 may be scheduled by a DCI (e.g., a DCI DCI1), or the PUSCH PUSCH0 may be a CG transmission.

However, the communication device may determine not to transmit (e.g., cancel) the HARQ feedback HARQ0. In one example, the communication device receives an indication (e.g., a CI CI0) indicating not to transmit the PUSCH PUSCH0, after receiving the DCI DCI1. In one example, the communication device receives an indication (e.g., the CI CI0), and determines not to transmit the PUSCH PUSCH0 according to the indication. In one example, the communication device determines not to transmit (e.g., cancel) the PUSCH PUSCH0, if the PUSCH PUSCH0 is collided with an UL transmission (e.g., a PUSCH or a PUCCH) and a priority index of the UL transmission is higher than a priority index of the PUSCH PUSCH0. In the above examples, the PUSCH PUSCH0 including the HARQ feedback HARQ0 may not be transmitted.

The communication device receives a DCI DCI2 after receiving the indication (e.g., the CI CI0), and the DCI DCI2 indicates a PUCCH PUCCH1 and may not indicate any PDSCH. The DCI DCI2 may be a latest DCI after the indication (e.g., the CI CI0). Then, the communication device transmits the HARQ feedback HARQ0 in the PUCCH PUCCH1. Note that the PUCCH PUCCH1 is not overlapped with the PUCCH PUCCH0 and the PUSCH PUSCH0. A priority index of the PUCCH PUCCH1 may be indicated by (or determined according to) the DCI DCI2. In one example, the priority index of the PUCCH PUCCH1 may be indicated by a RRC signaling, if the PDSCH PDSCH0 is a SPS PDSCH.

It should be noted that a time instant at which the communication device receives the DCI DCI2 is not limited to the content of the figure. In one example, the DCI DCI2 is received after the PUSCH PUSCH0. In one example, the DCI DCI2 is received after the communication device determines not to transmit the HARQ feedback HARQ0 in the PUSCH PUSCH0 (e.g., after the CI CI0).

In the present example, a number of bits for a HARQ feedback may be indicated by the DCI DCI2 and/or a configuration of the network.

In the present example, a priority index of the PUCCH PUCCH0 and a priority index of the PUCCH PUCCH1 are the same, e.g., 0. The HARQ feedback HARQ0 may not be transmitted in the PUCCH PUCCH1, if the priority indices of the PDSCH PDSCH0 and the PUCCH PUCCH1 are different.

In the present example, a first CORSET pool index of a first COREST for transmitting the DCI DCI0 and a second CORESET index of a second CORESET for transmitting the DCI DCI2 are the same, e.g., 0. The HARQ feedback HARQ0 may not be transmitted in the PUCCH PUCCH1, if the first CORSET pool index of the first COREST and the second CORESET index of the second CORESET are different.

Figure 9:
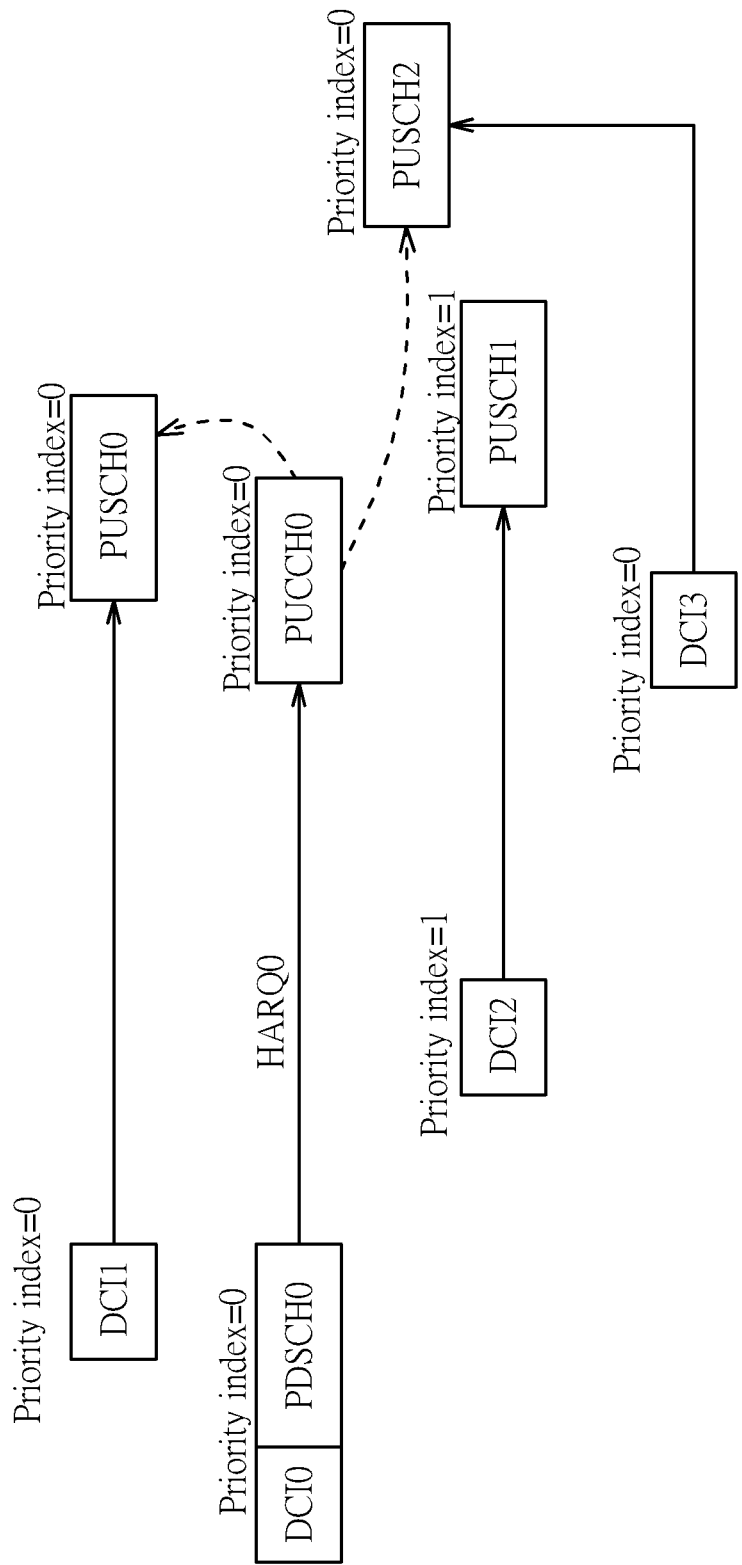
FIG. 9 is a schematic diagram of a retransmission of a HARQ feedback according to an example of the present invention.

FIG. 9 is a schematic diagram of a retransmission of a HARQ feedback according to an example of the present invention. The communication device receives a DCI DCI0, and the DCI DCI0 indicates (e.g., schedules) a reception of a PDSCH PDSCH0. The communication device prepares (e.g., is scheduled) to transmit a HARQ feedback HARQ0 in a PUCCH PUCCH0, after receiving the PDSCH PDSCH0.

In addition, the communication device may multiplex the HARQ feedback HARQ0 of the PUCCH PUCCH0 with a PUSCH PUSCH0, if the PUSCH PUSCH0 is collided with the PUCCH PUCCH0 (e.g., in a time period). In this situation, the communication device may not transmit the PUCCH PUCCH0 since the HARQ feedback HARQ0 has been multiplexed and transmitted in the PUSCH PUSCH0. For example, the PUSCH PUSCH0 may be scheduled by a DCI (e.g., a DCI DCI1), or the PUSCH PUSCH0 may be a CG transmission.

However, the communication device may determine not to transmit (e.g., cancel) the HARQ feedback HARQ0. In one example, the communication device determines not to transmit (e.g., cancel) the PUSCH PUSCH0, if the PUSCH PUSCH0 is collided with an UL transmission (e.g., a PUSCH PUSCH1) and a priority index of the UL transmission is higher than a priority index of the PUSCH PUSCH0. In one example, the UL transmission may be scheduled by a DCI (e.g., a DCI DCI2), or may be a CG transmission.

The communication device receives a DCI DCI3 indicating a PUSCH PUSCH2 (e.g., after receiving the DCI DCI2). The communication device multiplexes the HARQ feedback HARQ0 of the PUCCH PUCCH0 with the PUSCH PUSCH2, since priority indices of the PDSCH PDSCH0 and the PUSCH PUSCH2 are the same. Then, the communication device transmits the HARQ feedback HARQ0 in the PUSCH PUSCH2. Note that the PUCCH PUSCH2 is not overlapped with the PUCCH PUCCH0 and the PUSCH PUSCH0.

It should be noted that a time instant at which the communication device receives the DCI DCI3 is not limited to the content of the figure. In one example, the DCI DCI3 is received after the PUSCH PUSCH0. In one example, the DCI DCI3 is received after the communication device determines not to transmit the HARQ feedback HARQ0 in the PUSCH PUSCH0 (e.g., after the DCI DCI2).

In the present example, a priority index of the PUCCH PUCCH0 and a priority index of the PUSCH PUSCH2 are the same, e.g., 0. The HARQ feedback HARQ0 may not be transmitted in the PUSCH PUSCH2, if the priority indices of the PUCCH PUCCH0 and the PUSCH PUSCH2 are different.

In one example, according to a network configuration (e.g., gNB configuration) and/or a capability (e.g., UE capability) of the communication device, the HARQ feedback HARQ0 may be transmitted in the PUSCH PUSCH2 even if the priority indices of the PUCCH PUCCH0 and the PUSCH PUSCH2 are different.

In one example, the PDSCH PDSCH0 may be a SPS PDSCH, i.e., not scheduled by a DCI. In one example, the PUSCH PUSCH2 may be a CG PUSCH, i.e., not scheduled by a DCI.

Figure 10:
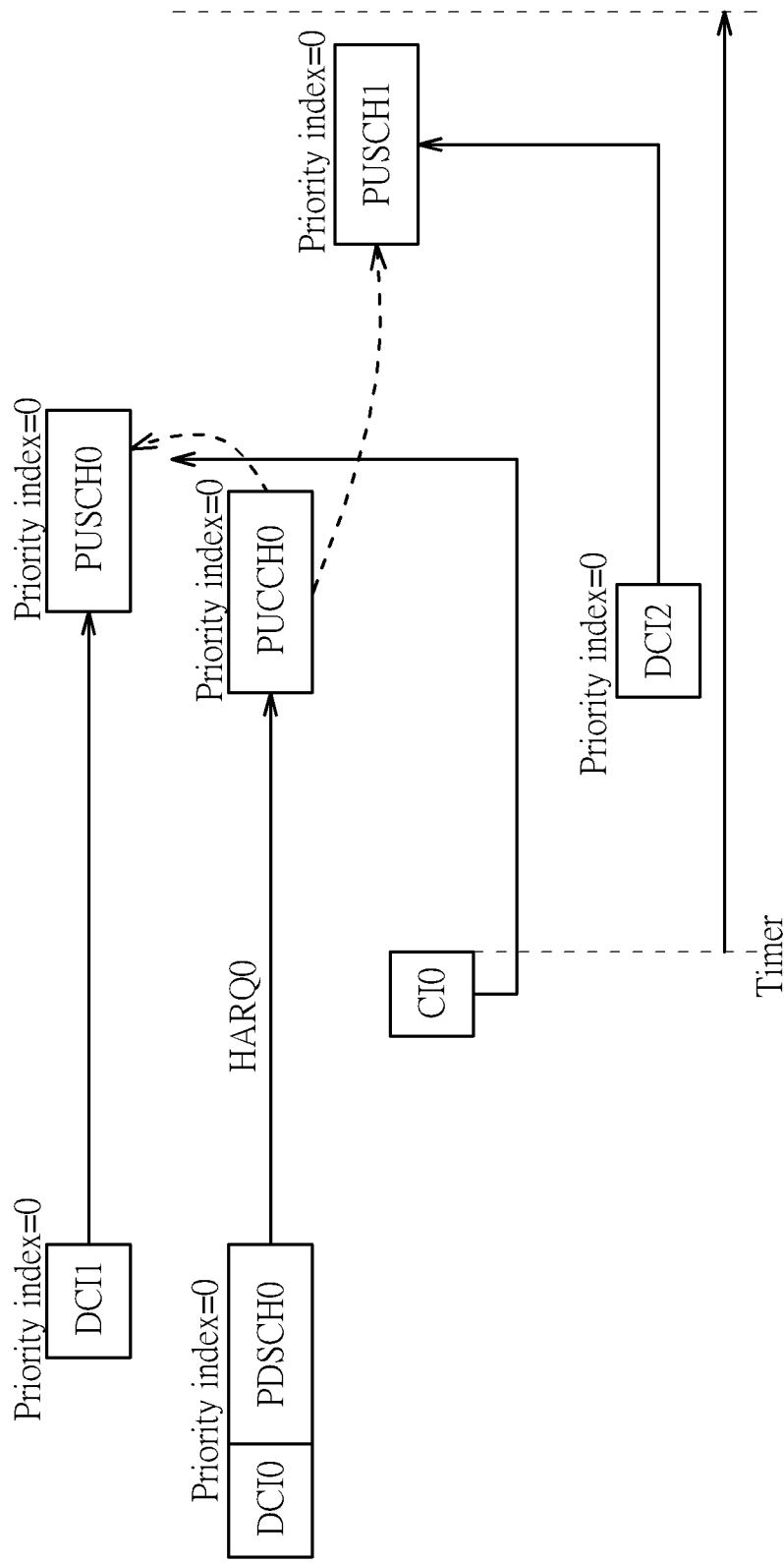
FIG. 10 is a schematic diagram of a retransmission of a HARQ feedback according to an example of the present invention.

FIG. 10 is a schematic diagram of a retransmission of a HARQ feedback according to an example of the present invention. The communication device receives a DCI DCI0, and the DCI DCI0 indicates (e.g., schedules) a reception of a PDSCH PDSCH0. The communication device prepares (e.g., is scheduled) to transmit a HARQ feedback HARQ0 in a PUCCH PUCCH0, after receiving the PDSCH PDSCH0. In one example, the PDSCH PDSCH0 may be a SPS PDSCH, i.e., not scheduled by a DCI.

In addition, the communication device may multiplex the HARQ feedback HARQ0 of the PUCCH PUCCH0 with a PUSCH PUSCH0, if the PUSCH PUSCH0 is collided with the PUCCH PUCCH0 (e.g., in a time period). In this situation, the communication device may not transmit the PUCCH PUCCH0 since the HARQ feedback HARQ0 has been multiplexed and transmitted in the PUSCH PUSCH0. For example, the PUSCH PUSCH0 may be scheduled by a DCI (e.g., a DCI DCI1), or the PUSCH PUSCH0 may be a CG transmission.

However, the communication device may determine not to transmit (e.g., cancel) the HARQ feedback HARQ0. In one example, the communication device receives an indication (e.g., a CI CI0) indicating not to transmit the PUSCH PUSCH0, after receiving the DCI DCI1. In one example, the communication device receives an indication (e.g., the CI CI0), and determines not to transmit the PUSCH PUSCH0 according to the indication. In one example, the communication device determines not to transmit (e.g., cancel) the PUSCH PUSCH0, if the PUSCH PUSCH0 is collided with an UL transmission (e.g., a PUSCH or a PUCCH) and a priority index of the UL transmission is higher than a priority index of the PUSCH PUSCH0. In the above examples, the PUSCH PUSCH0 including the HARQ feedback HARQ0 may not be transmitted.

Accordingly, the PUCCH PUCCH0 including the HARQ feedback HARQ0 cannot be transmitted. The communication device may start a timer when receiving the indication (e.g., the CI CI0).

The communication device receives a DCI DCI2 indicating a PUSCH PUSCH1 after receiving the DCI DCI1. The communication device multiplexes the PUCCH PUCCH0 and the PUSCH PUSCH1, since the timer does not expire at a time instant of transmitting the PUSCH PUSCH1. That is, a time distance between a first time instant of receiving the CI and a second time instant of transmitting the PUSCH PUSCH1 is smaller than a threshold. Then, the communication device transmits the HARQ feedback HARQ0 in the PUSCH PUSCH1. Note that the PUSCH PUSCH1 is not overlapped with the PUCCH PUCCH0 and the PUSCH PUSCH0. For example, the threshold may be a number of slots, a number of sub-slots or a number of symbols. For example, the threshold may be indicated by the network (e.g., gNB), e.g., via a RRC signaling. For example, the threshold may be determined according to at least one HARQ feedback timing configured by the network. For example, the threshold may be a maximum value of the at least one HARQ feedback timing.

It should be noted that a time instant at which the communication device receives the DCI DCI2 is not limited to the content of the figure. In one example, the DCI DCI2 is received after the PUSCH PUSCH0. In one example, the DCI DCI2 is received after the communication device determines not to transmit the HARQ feedback HARQ0 in the PUSCH PUSCH0 (e.g., after the CI CI0).

In other example, the communication device may start a timer when receiving the PDSCH PDSCH0, if the HARQ feedback HARQ0 of the PDSCH PDSCH0 is determined not to be transmitted (e.g., cancelled).

The communication device receives a DCI DCI2 indicating a PUSCH PUSCH1 after receiving the DCI DCI1. The communication device multiplexes the PUCCH PUCCH0 and the PUSCH PUSCH1, since the timer does not expire at a time instant of transmitting the PUSCH PUSCH1. That is, a time distance between a first time instant of receiving the PDSCH PDSCH0 and a second time instant of transmitting the PUSCH PUSCH1 is smaller than a threshold. Then, the communication device transmits the HARQ feedback HARQ0 in the PUSCH PUSCH1. Note that the PUSCH PUSCH1 is not overlapped with the PUCCH PUCCH0 and the PUSCH PUSCH0. For example, the threshold may be a number of slots, a number of sub-slots or a number of symbols. For example, the threshold may be indicated by the network (e.g., gNB), e.g., via a RRC signaling. For example, the threshold may be determined according to at least one HARQ feedback timing configured by the network. For example, the threshold may be a maximum value of the at least one HARQ feedback timing.

In the present example, a priority index of the PUCCH PUCCH0 and a priority index of the PUSCH PUSCH1 are the same, e.g., 0. The HARQ feedback HARQ0 may not be transmitted in the PUSCH PUSCH1, if the priority indices of the PUCCH PUCCH0 and the PUSCH PUSCH1 are different.

In one example, according to a network configuration (e.g., gNB configuration) and/or a capability (e.g., UE capability) of the communication device, the HARQ feedback HARQ0 may be transmitted in the PUSCH PUSCH1 even if the priority indices of the PUCCH PUCCH0 and the PUSCH PUSCH1 are different.

In one example, the PDSCH PDSCH0 may be a SPS PDSCH, i.e., not scheduled by a DCI. In one example, the PUSCH PUSCH1 may be a CG PDSCH, i.e., not scheduled by a DCI.

Figure 11:
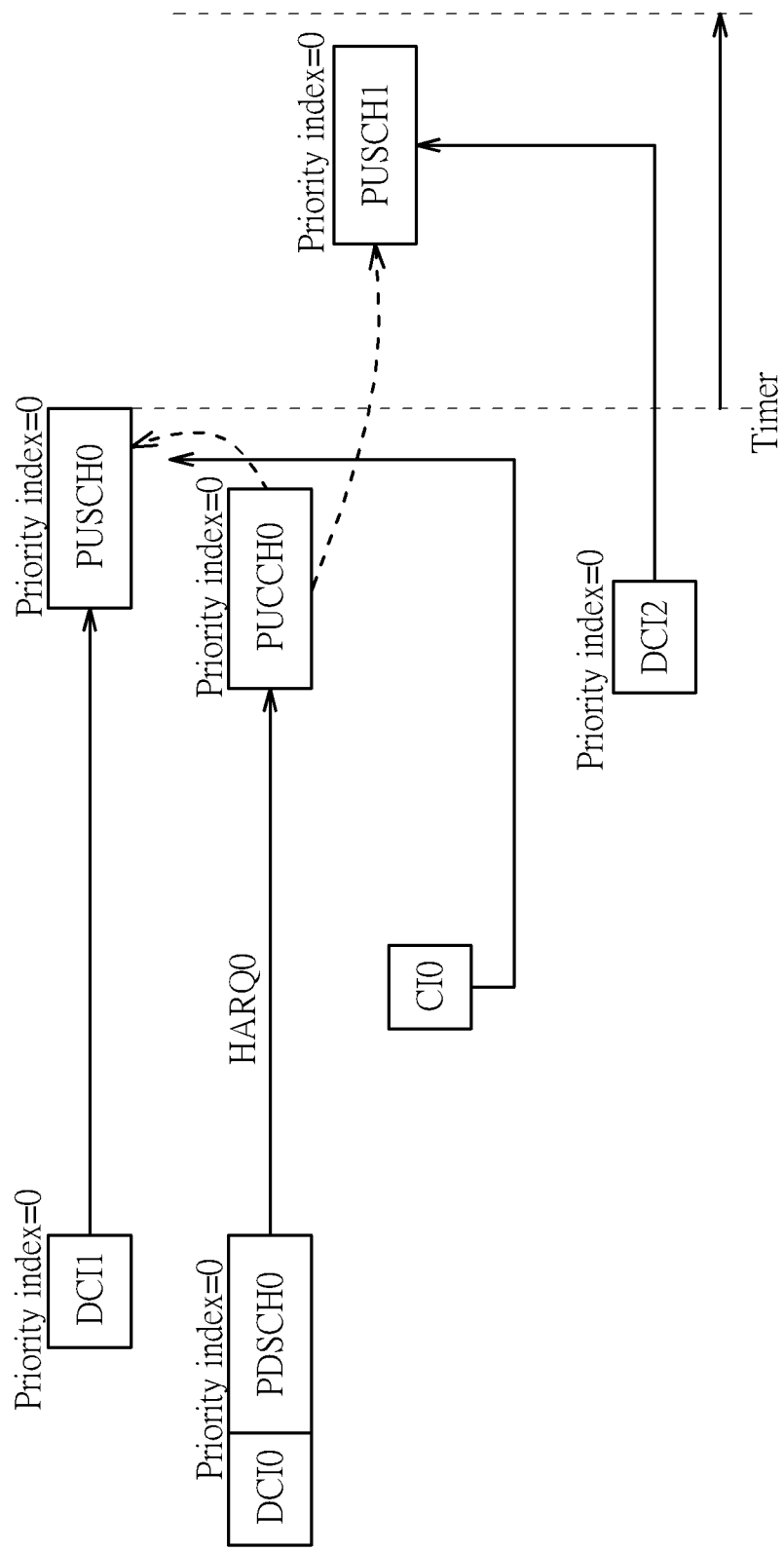
FIG. 11 is a schematic diagram of a retransmission of a HARQ feedback according to an example of the present invention.

FIG. 11 is a schematic diagram of a retransmission of a HARQ feedback according to an example of the present invention. The communication device receives a DCI DCI0, and the DCI DCI0 indicates (e.g., schedules) a reception of a PDSCH PDSCH0. The communication device prepares (e.g., is scheduled) to transmit a HARQ feedback HARQ0 in a PUCCH PUCCH0, after receiving the PDSCH PDSCH0.

In addition, the communication device may multiplex the HARQ feedback HARQ0 of the PUCCH PUCCH0 with a PUSCH PUSCH0, if the PUSCH PUSCH0 is collided with the PUCCH PUCCH0 (e.g., in a time period). In this situation, the communication device may not transmit the PUCCH PUCCH0 since the HARQ feedback HARQ0 has been multiplexed and transmitted in the PUSCH PUSCH0. For example, the PUSCH PUSCH0 may be scheduled by a DCI (e.g., a DCI DCI1), or the PUSCH PUSCH0 may be a CG transmission.

However, the communication device may determine not to transmit (e.g., cancel) the HARQ feedback HARQ0. In one example, the communication device receives an indication (e.g., a CI CI0) indicating not to transmit the PUSCH PUSCH0, after receiving the DCI DCI1. In one example, the communication device receives an indication (e.g., the CI CI0), and determines not to transmit the PUSCH PUSCH0 according to the indication. In one example, the communication device determines not to transmit (e.g., cancel) the PUSCH PUSCH0, if the PUSCH PUSCH0 is collided with an UL transmission (e.g., a PUSCH or a PUCCH) and a priority index of the UL transmission is higher than a priority index of the PUSCH PUSCH0. In the above examples, the PUSCH PUSCH0 including the HARQ feedback HARQ0 may not be transmitted.

Accordingly, the PUSCH PUSCH0 including the HARQ feedback HARQ0 cannot be transmitted. The communication device may start a timer according to a (e.g., scheduled) time instant (e.g., time slot) of the PUSCH PUSCH0.

The communication device receives a DCI DCI2 indicating a PUSCH PUSCH1 after receiving the DCI DCI1. The communication device multiplexes the HARQ feedback HARQ0 of the PUCCH PUCCH0 with the PUSCH PUSCH1, since the timer does not expire at a time instant of transmitting the PUSCH PUSCH1. That is, a time distance between a first time instant of transmitting the PUSCH PUSCH0 and a second time instant of transmitting the PUSCH PUSCH1 is smaller than a threshold. Then, the communication device transmits the HARQ feedback HARQ0 in the PUSCH PUSCH1. Note that the PUSCH PUSCH1 is not overlapped with the PUCCH PUCCH0 and the PUSCH PUSCH0. For example, the threshold may be a number of slots, a number of sub-slots or a number of symbols. For example, the threshold may be indicated by the network (e.g., gNB), e.g., via a RRC signaling. For example, the threshold may be determined according to at least one HARQ feedback timing configured by the network. For example, the threshold may be a maximum value of the at least one HARQ feedback timing.

It should be noted that a time instant at which the communication device receives the DCI DCI2 is not limited to the content of the figure. In one example, the DCI DCI2 is received after the PUSCH PUSCH0. In one example, the DCI DCI2 is received after the communication device determines not to transmit the HARQ feedback HARQ0 in the PUSCH PUSCH0.

In the present example, a priority index of the PUCCH PUCCH0 and a priority index of the PUSCH PUSCH1 are the same, e.g., 0. The HARQ feedback HARQ0 may not be transmitted in the PUSCH PUSCH1, if the priority indices of the PUCCH PUCCH0 and the PUSCH PUSCH1 are different.

In one example, according to a network configuration (e.g., gNB configuration) and/or a capability (e.g., UE capability) of the communication device, the HARQ feedback HARQ0 may be transmitted in the PUSCH PUSCH1 even if the priority indices of the PUCCH PUCCH0 and the PUSCH PUSCH1 are different.

In one example, the PDSCH PDSCH0 may be a SPS PDSCH, i.e., not scheduled by a DCI. In one example, the PUSCH PUSCH1 may be a CG PDSCH, i.e., not scheduled by a DCI.

Figure 12:
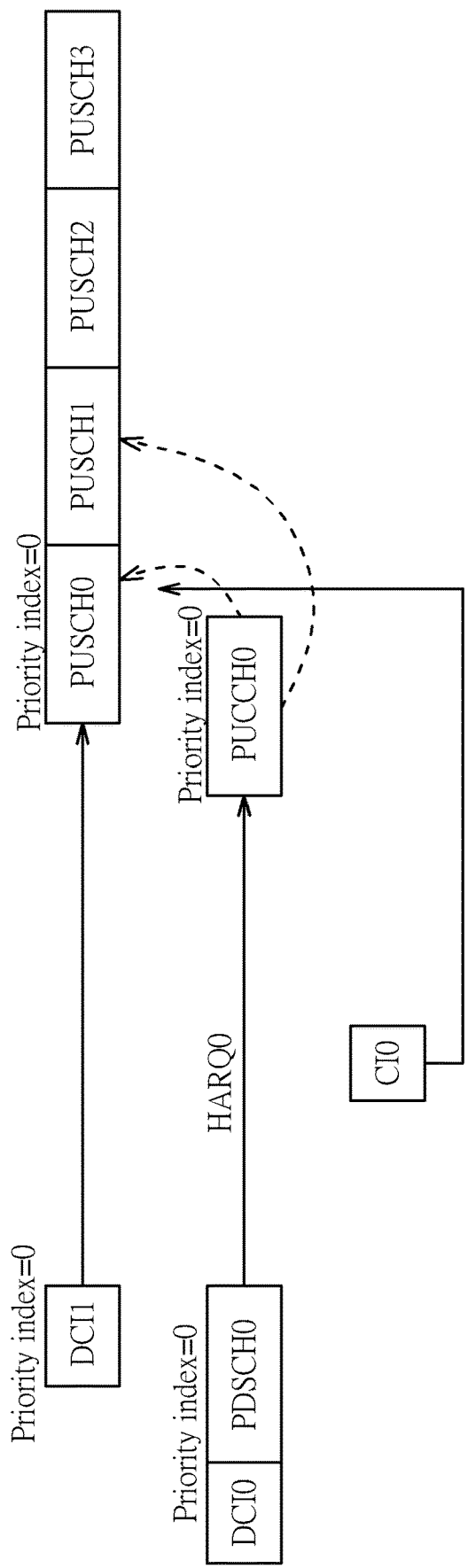
FIG. 12 is a schematic diagram of a retransmission of a HARQ feedback according to an example of the present invention.

FIG. 12 is a schematic diagram of a retransmission of a HARQ feedback according to an example of the present invention. The communication device receives a DCI DCI0, and the DCI DCI0 indicates (e.g., schedules) a reception of a PDSCH PDSCH0. The communication device prepares (e.g., is scheduled) to transmit a HARQ feedback HARQ0 in a PUCCH PUCCH0, after receiving the PDSCH PDSCH0. In one example, the communication device receives a DCI DCI1, and the DCI DCI1 indicates (e.g., schedules) transmissions of PUSCHs PUSCH0-PUSCH3. In one example, the PUSCHs PUSCH0-PUSCH3 are CG transmissions. The PUSCHs PUSCH1-PUSCH3 are repetitions of the PUSCH PUSCH0. The communication device intends to multiplex the HARQ feedback HARQ0 of the PUCCH PUCCH0 with the PUSCH PUSCH0, since the PUCCH PUCCH0 and the PUSCH PUSCH0 are overlapped.

However, the communication device receives a CI CI0 which cancels the transmission of the PUSCH PUSCH0, after receiving the DCI DCI1. Accordingly, the PUSCH PUSCH0 including the HARQ feedback HARQ0 cannot be transmitted.

Then, the communication device may multiplex the HARQ feedback HARQ0 with a latest UL resource. For example, the communication device multiplexes the HARQ feedback HARQ0 of the PUCCH PUCCH0 with the PUSCH PUSCH1 to transmit the HARQ feedback HARQ0 in the PUSCH PUSCH1.

In the present example, a priority index of the PUCCH PUCCH0 and priority indices of the PUSCHs PUSCH0-PUSCH3 are the same, e.g., 0. The HARQ feedback HARQ0 may not be transmitted in the PUSCH PUSCH1, if the priority indices of the PUCCH PUCCH0 and the PUSCHs PUSCH0-PUSCH3 are different.

In one example, according to a network configuration (e.g., gNB configuration) and/or a capability (e.g., UE capability) of the communication device, the HARQ feedback HARQ0 may be transmitted in the PUSCH PUSCH1 even if the priority indices of the PUCCH PUCCH0 and the PUSCHs PUSCH0-PUSCH3 are different.

In one example, the PDSCH PDSCH0 may be a SPS PDSCH, i.e., not scheduled by a DCI. In one example, the PUSCHs PUSCH0-PUSCH3 may be CG PUSCHs, i.e., not scheduled by a DCI.

Figure 13:
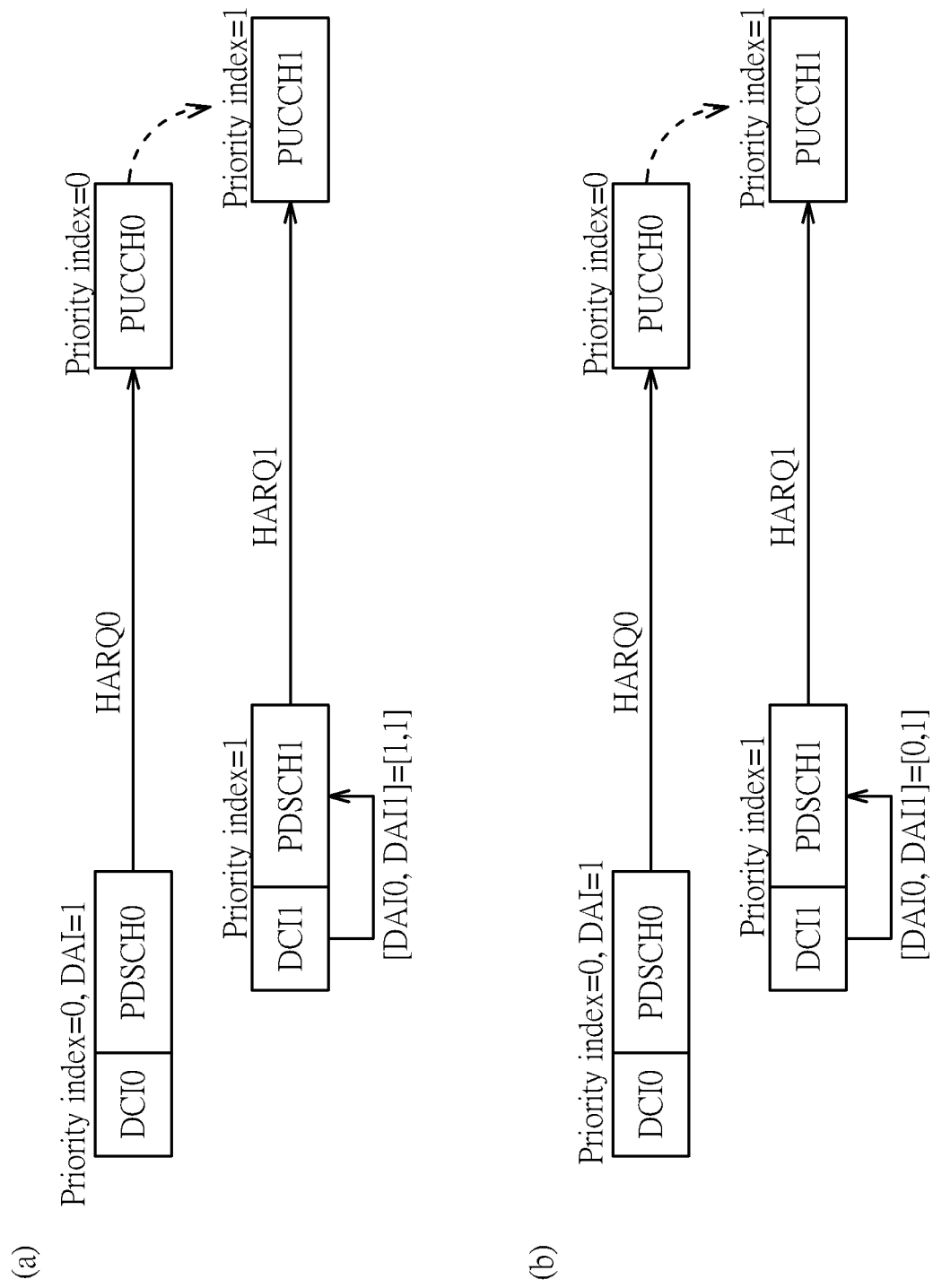
FIG. 13 is a schematic diagram of a retransmission of a HARQ feedback according to an example of the present invention.

FIG. 13 is a schematic diagram of a retransmission of a HARQ feedback according to an example of the present invention. The communication device receives a DCI DCI0, and the DCI DCI0 indicates (e.g., schedules) a reception of a PDSCH PDSCH0. In addition, the DCI DCI0 may indicate a DAI (e.g., DAI=1) for the PDSCH PDSCH0. The communication device prepares (e.g., is scheduled) to transmit a HARQ feedback HARQ0 in a PUCCH PUCCH0, after receiving the PDSCH PDSCH0. In addition, the communication device receives a DCI DCI1 after receiving the DCI DCI0, and the DCI DCI1 indicates (e.g., schedules) a reception of a PDSCH PDSCH1. The DCI DCI1 may be a latest DCI after the DCI DCI0. The communication device prepares to transmit a HARQ feedback HARQ1 in a PUCCH PUCCH1 in response to the reception of the PDSCH PDSCH1. In one example, the PDSCH PDSCH0 may be a SPS PDSCH, i.e., not scheduled by a DCI.

In the present example, a priority index of the PUCCH PUCCH0 and a priority index of the PUCCH PUCCH1 are different (or a priority index of the PDSCH PDSCH0 and a priority index of the PDSCH PDSCH1 are different). DAIs for the PDSCHs PDSCH0 and PDSCH1 are DAI0 and DAI1, respectively, and may be transmitted in the DCI DCI1.

In the case (a), values of the DAIs DAI0 and DAI1 are 1 and 1, respectively. DAI0=1 means that there is resource for the priority index=0 (e.g., a HARQ feedback of the PDSCH PDSCH0) in the PUCCH PUCCH1 DAI1=1 means that there is resource for the priority index=1 (e.g., a HARQ feedback of the PDSCH PDSCH1) in the PUCCH PUCCH1. That is, the values of the DAIs DAI0 and DAI1 mean that the communication device can multiplex the HARQ feedback HARQ0 with the PUCCH PUCCH1. Thus, the communication device may transmit the HARQ feedbacks HARQ0 and HARQ1 in the PUCCH PUCCH1 according to the DAIs DAI0 and DAI1.

In the case (b), values of the DAIs DAI0 and DAI1 are 0 and 1, respectively. DAI0=0 means that there is no resource for the priority index=0 (e.g., a HARQ feedback of the PDSCH PDSCH0) in the PUCCH PUCCH1. DAI1=1 means that there is resource for the priority index=1 (e.g., a HARQ feedback of the PDSCH PDSCH1) in the PUCCH PUCCH1. That is, the values of the DAIs DAI0 and DAI1 mean that the communication device cannot multiplex the HARQ feedback HARQ0 with the PUCCH PUCCH1. Thus, the communication device may drop the HARQ feedback HARQ0 and may transmit the HARQ feedback HARQ1 in the PUCCH PUCCH1.

Figure 14:
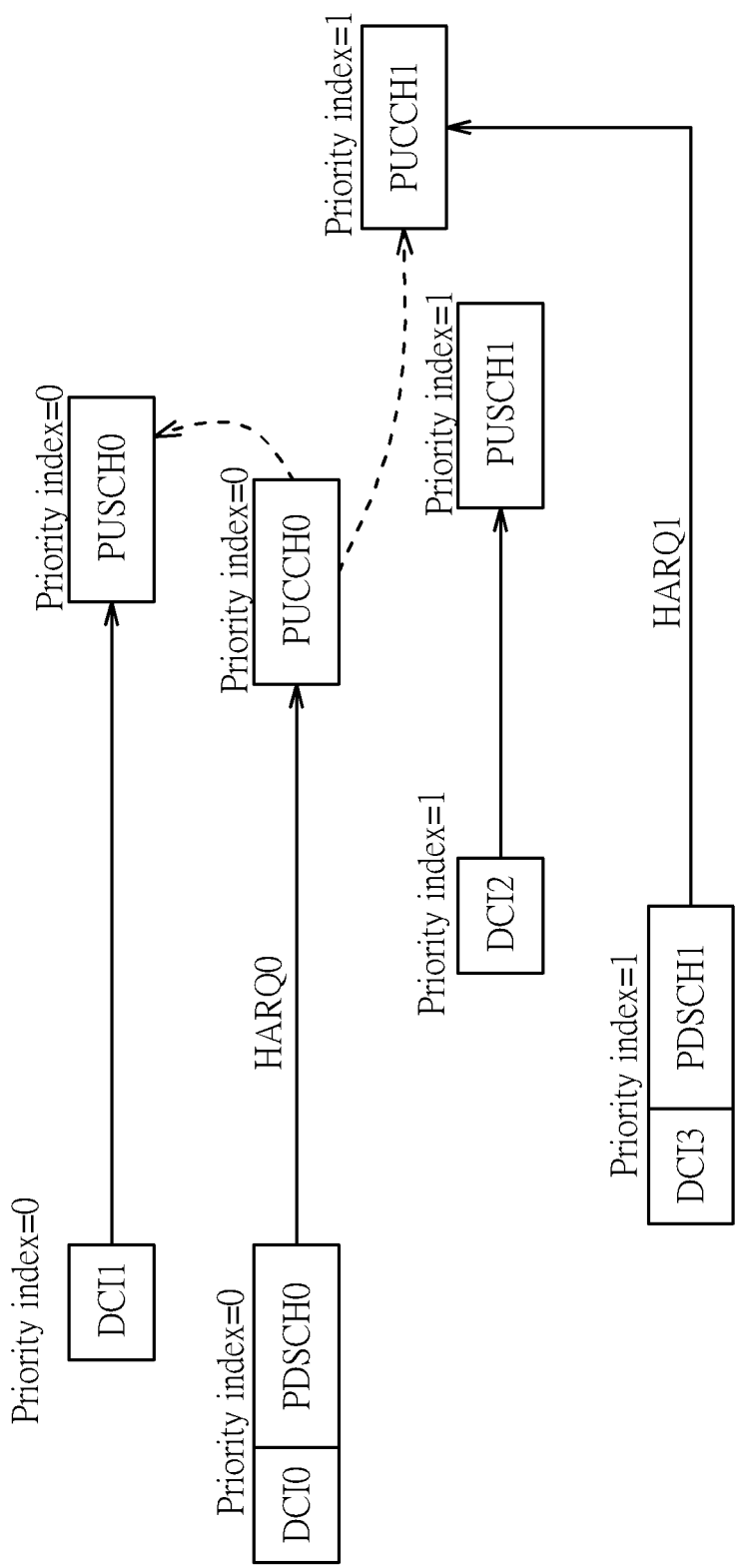
FIG. 14 is a schematic diagram of a retransmission of a HARQ feedback according to an example of the present invention.

FIG. 14 is a schematic diagram of a retransmission of a HARQ feedback according to an example of the present invention. The communication device receives a DCI DCI0, and the DCI DCI0 indicates (e.g., schedules) a reception of a PDSCH PDSCH0. The communication device prepares (e.g., is scheduled) to transmit a HARQ feedback HARQ0 in a PUCCH PUCCH0, after receiving the PDSCH PDSCH0. In one example, the PDSCH PDSCH0 may be a SPS PDSCH, i.e., not scheduled by a DCI.

In addition, the communication device may multiplex the HARQ feedback HARQ0 of the PUCCH PUCCH0 with a PUSCH PUSCH0, if the PUSCH PUSCH0 is collided with the PUCCH PUCCH0 (e.g., in a time period). In this situation, the communication device may not transmit the PUCCH PUCCH0 since the HARQ feedback HARQ0 has been multiplexed and transmitted in the PUSCH PUSCH0. For example, the PUSCH PUSCH0 may be scheduled by a DCI (e.g., a DCI DCI1), or the PUSCH PUSCH0 may be a CG transmission.

However, the communication device may determine not to transmit (e.g., cancel) the HARQ feedback HARQ0. In one example, the communication device determines not to transmit (e.g., cancel) the PUSCH PUSCH0, if the PUSCH PUSCH0 is collided with an UL transmission (e.g., a PUSCH PUSCH1) and a priority index of the UL transmission is higher than a priority index of the PUSCH PUSCH0. In one example, the UL transmission may be scheduled by a DCI (e.g., a DCI DCI2), or may be a CG transmission.

The communication device receives a DCI DCI3, and the DCI DCI3 indicates (e.g., schedules) a reception of a PDSCH PDSCH1. The communication device prepares (e.g., is scheduled) to transmit a HARQ feedback HARQ1 in a PUCCH PUCCH1, after receiving the PDSCH PDSCH1. The HARQ feedback HARQ1 is not for a retransmission. In one example, the PDSCH PDSCH1 may be a SPS PDSCH, i.e., not scheduled by a DCI.

It should be noted that a time instant at which the communication device receives the DCI DCI3 is not limited to the content of the figure. In one example, the DCI DCI3 is received after the PUSCH PUSCH0. In one example, the DCI DCI3 is received after the communication device determines not to transmit the HARQ feedback HARQ0 in the PUSCH PUSCH0 (e.g., after the DCI DCI2).

The communication device multiplexes the HARQ feedback HARQ0 of the PUCCH PUCCH0 with the PUCCH PUCCH1, even if priority indices of the PDSCHs PDSCH0 and PDSCH1 are different. Then, the communication device transmits the HARQ feedback HARQ0 in the PUCCH PUCCH1. Note that the PUCCH PUCCH1 is not overlapped with the PUCCH PUCCH0 and the PUSCH PUSCH0. The HARQ feedback HARQ0 is appended to (i.e., located after) the HARQ feedback HARQ1, when the HARQ feedbacks HARQ0 and HARQ1 are transmitted in the PUCCH PUCCH1.

Figure 15:
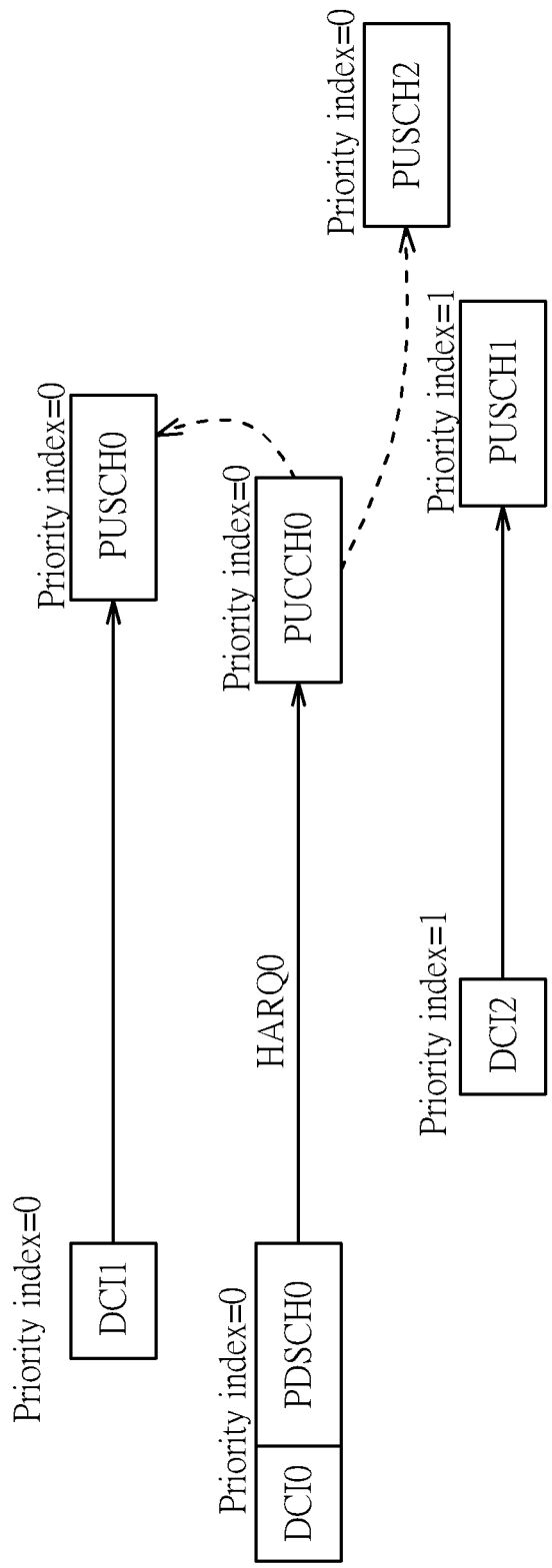
FIG. 15 is a schematic diagram of a retransmission of a HARQ feedback according to an example of the present invention.

FIG. 15 is a schematic diagram of a retransmission of a HARQ feedback according to an example of the present invention. The communication device receives a DCI DCI0, and the DCI DCI0 indicates (e.g., schedules) a reception of a PDSCH PDSCH0. The communication device prepares (e.g., is scheduled) to transmit a HARQ feedback HARQ0 in a PUCCH PUCCH0, after receiving the PDSCH PDSCH0. In one example, the PDSCH PDSCH0 may be a SPS PDSCH, i.e., not scheduled by a DCI.

In addition, the communication device may multiplex the HARQ feedback HARQ0 of the PUCCH PUCCH0 with a PUSCH PUSCH0, if the PUSCH PUSCH0 is collided with the PUCCH PUCCH0 (e.g., in a time period). In this situation, the communication device may not transmit the PUCCH PUCCH0 since the HARQ feedback HARQ0 has been multiplexed and transmitted in the PUSCH PUSCH0. For example, the PUSCH PUSCH0 may be scheduled by a DCI (e.g., a DCI DCI1), or the PUSCH PUSCH0 may be a CG transmission.

However, the communication device may determine not to transmit (e.g., cancel) the HARQ feedback HARQ0. In one example, the communication device determines not to transmit (e.g., cancel) the PUSCH PUSCH0, if the PUSCH PUSCH0 is collided with an UL transmission (e.g., a PUSCH PUSCH1) and a priority index of the UL transmission is higher than a priority index of the PUSCH PUSCH0. In one example, the UL transmission may be scheduled by a DCI (e.g., a DCI DCI2), or may be a CG transmission.

The communication device multiplexes the HARQ feedback HARQ0 of the PUCCH PUCCH0 with a PUSCH PUSCH2 which is a CG transmission, since priority indices of the PDSCH PDSCH0 and the PUSCH PUSCH2 are the same. Then, the communication device transmits the HARQ feedback HARQ0 in the PUSCH PUSCH2. Note that the PUSCH PUSCH2 is not overlapped with the PUCCH PUCCH0 and the PUSCH PUSCH0.

It should be noted that a HARQ may also be termed as a HARQ acknowledgement (HARQ-ACK).

The operation of "determine" described above may be replaced by the operation of "compute", "calculate", "obtain", "generate", "output, "use", "choose/select", "decide" or "is configured to". The term of "according to" described above may be replaced by "in response to". The phrase of "associated with" described above may be replaced by "of" or "corresponding to". The term of "via" described above may be replaced by "on", "in" or "at".

Those skilled in the art should readily make combinations, modifications and/or alterations to the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit (s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and a method for handling a HARQ retransmission. A HARQ feedback can be transmitted in a later channel to a network according to the above examples, if a scheduled transmission of the HARQ feedback is cancelled. Thus, the retransmission of the HARQ feedback is solved. As a result, communication between the communication device and the network can proceed regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a hybrid automatic repeat request (HARQ) retransmission, comprising:
at least one storage device; and
at least one processing circuit, coupled to the at least one storage device, wherein the at least one storage device stores instructions, and the at least one processing circuit is configured to execute the instructions of:
receiving a first physical downlink (DL) shared channel (PDSCH) from a network, wherein a first HARQ feedback corresponding to the first PDSCH is allocated in a first uplink (UL) channel and the first UL channel is corresponding to a first priority index;
determining not to transmit the first HARQ feedback in the first UL channel;
determining a second UL channel for the first HARQ feedback, wherein the second UL channel is corresponding to a second priority index; and
transmitting the first HARQ feedback in the second UL channel;
wherein the communication device determines not to transmit the first HARQ feedback, when the first UL channel is collided with a third UL channel and the third UL channel is corresponding to a third priority index higher than the first priority index.

2. The communication device of claim 1, wherein the second UL channel is indicated by a first DL control information (DCI).

3. The communication device of claim 2, wherein a location of the first HARQ feedback in the second UL channel is determined according to the first DCI.

4. The communication device of claim 2, wherein a first payload size reserved for transmitting the first HARQ feedback is determined according to the first DCI.

5. The communication device of claim 2, wherein a first control resource set (CORSET) pool index of the first DCI and a second CORESET pool index of a second DCI indicating the first PDSCH are the same.

6. The communication device of claim 2, wherein the first DCI does not indicate any PDSCH.

7. The communication device of claim 2, wherein the first DCI comprises a first DL assignment index (DAI) corresponding to the first priority index and a second DAI corresponding to the second priority index.

8. The communication device of claim 2, wherein the first DCI is received after the first UL channel.

9. The communication device of claim 2, wherein the first DCI is received after determining not to transmit the first HARQ feedback in the first UL channel.

10. The communication device of claim 1, wherein the second UL channel is a second repetition of a physical UL shared channel (PUSCH) after a first repetition of the PUSCH, and the first UL channel is the first repetition of the PUSCH.

11. The communication device of claim 1, wherein the communication device determines not to transmit the first HARQ feedback in the first UL channel and transmits the first HARQ feedback in the second UL channel according to an indication transmitted by the network.

12. The communication device of claim 1, wherein the first priority index and the second priority index are the same.

13. The communication device of claim 1, wherein a first location of the first HARQ feedback in the second UL channel is after a second location of a second HARQ feedback, and the second HARQ feedback is an initial transmission in the second UL channel.

14. The communication device of claim 1, wherein a first location of the first HARQ feedback in the second UL channel is determined according to the first priority index and the second priority index.

15. The communication device of claim 1, wherein a first payload size reserved for transmitting the first HARQ feedback is a fixed value, or is determined according to a configuration of the network.

16. The communication device of claim 1, wherein a time distance between the first UL channel and the second UL channel is not greater than a threshold.

17. The communication device of claim 16, wherein the threshold is indicated by the network.

18. The communication device of claim 1, wherein the first PDSCH is scheduled by a second DCI.

19. The communication device of claim 1, wherein the first PDSCH is scheduled by a semi-persistent scheduling (SPS).

20. The communication device of claim 1, wherein the communication device determines not to transmit the first HARQ feedback according to an indication.

21. The communication device of claim 1, wherein the second UL channel comprises a second HARQ feedback corresponding to a third priority index different from the first priority index.

22. The communication device of claim 1, wherein a second payload size reserved for transmitting a second HARQ feedback in the second UL channel is determined according to a third DCI indicating the second UL channel.

23. The communication device of claim 1, wherein the second priority index of the second UL channel is determined according to a third DCI indicating the second UL channel.

* * * * *